Figure 1:
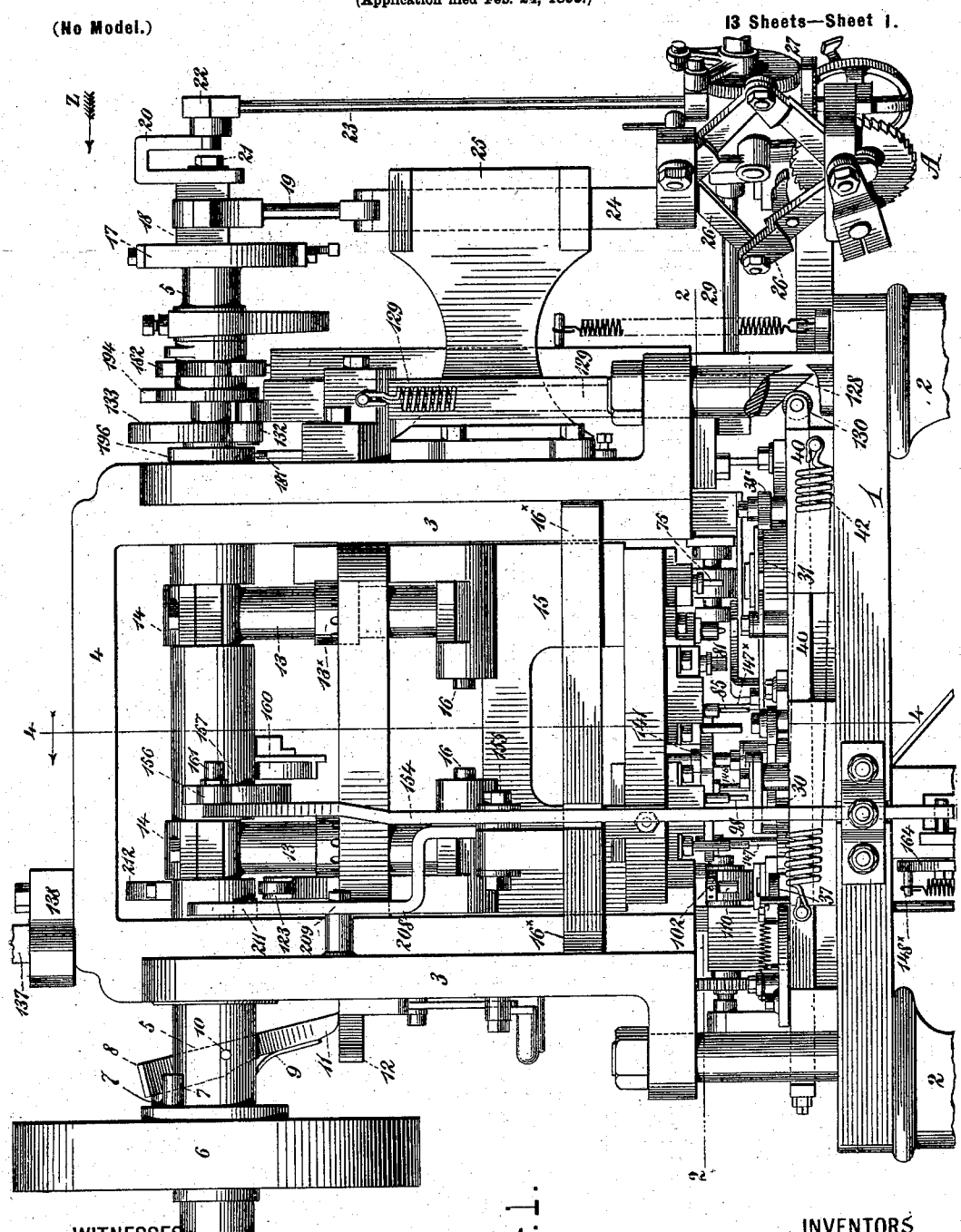

No. 654,612. Patented July 31, 1900.
J. DRAHER & F. MARGGRAFF.
METAL WORKING MACHINE FOR MAKING TACKS, &c.
(Application filed Feb. 24, 1899.)

(No Model.) 13 Sheets—Sheet 2.

WITNESSES:
INVENTORS
John Draher
Frederick Marggraff
BY
their ATTORNEYS

No. 654,612. Patented July 31, 1900.
J. DRAHER & F. MARGGRAFF.
METAL WORKING MACHINE FOR MAKING TACKS, &c.
(Application filed Feb. 24, 1899.)
(No Model.) 13 Sheets—Sheet 3.
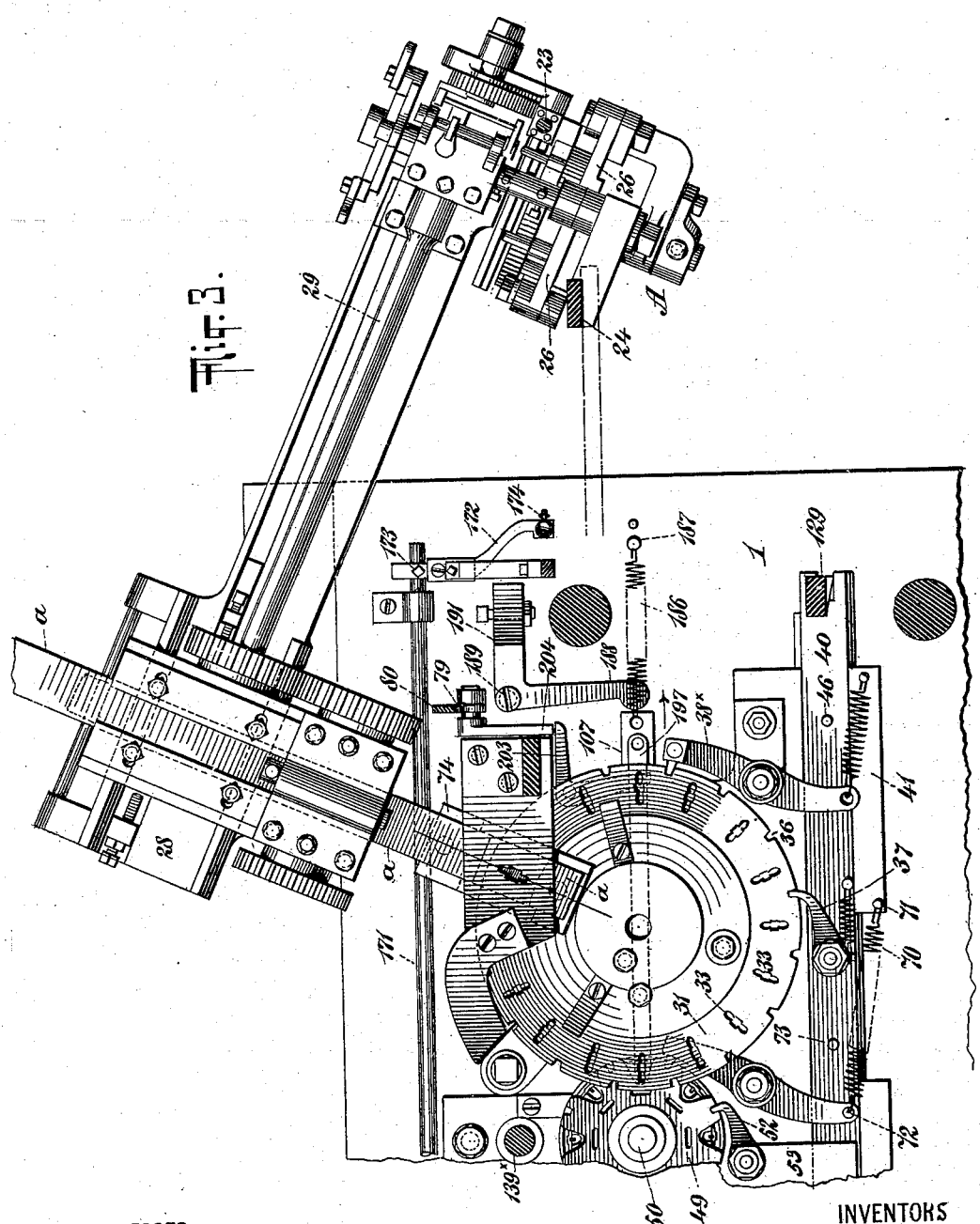
WITNESSES:
INVENTORS
John Draher
Friedrich Marggraff
BY
their ATTORNEYS

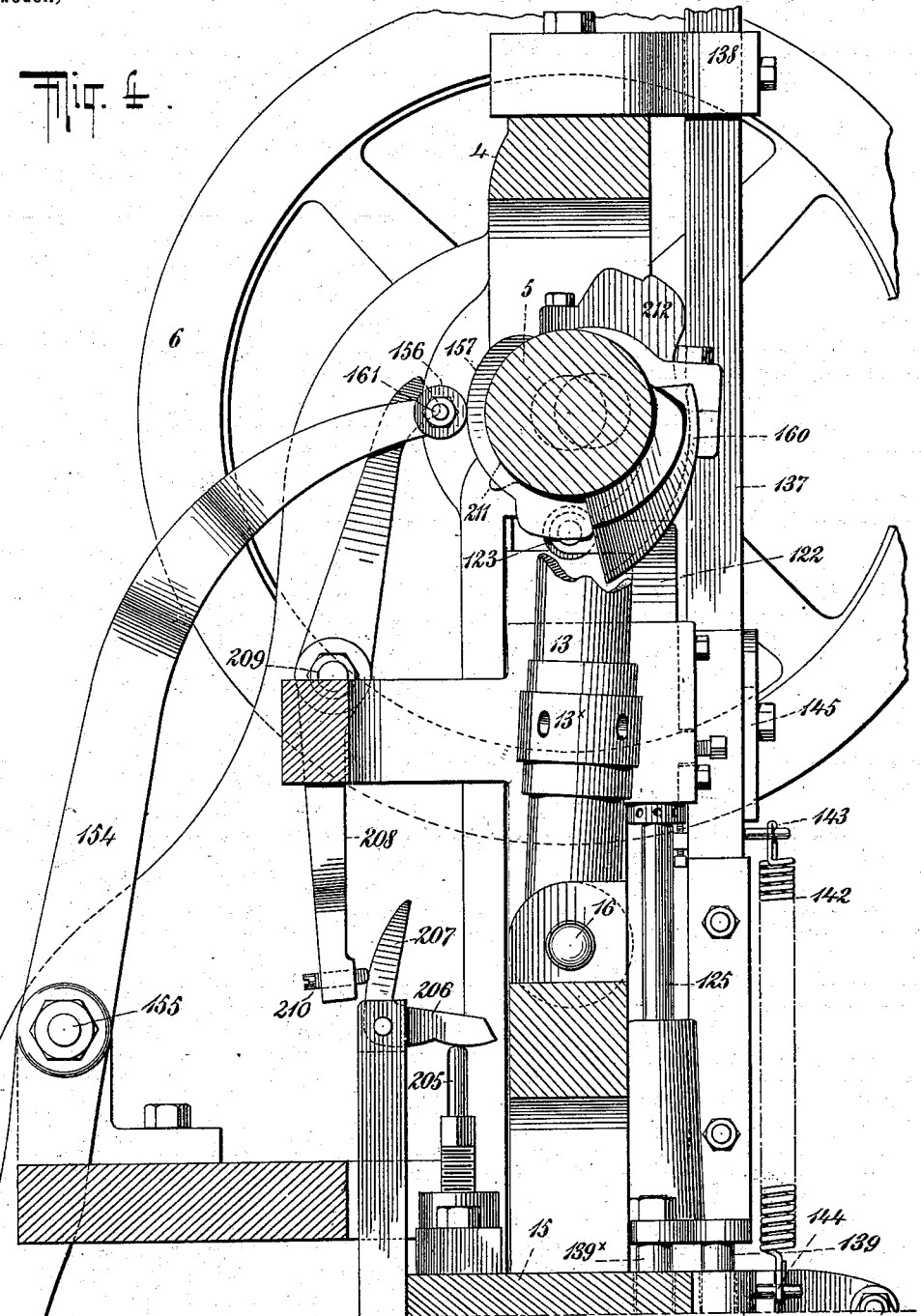

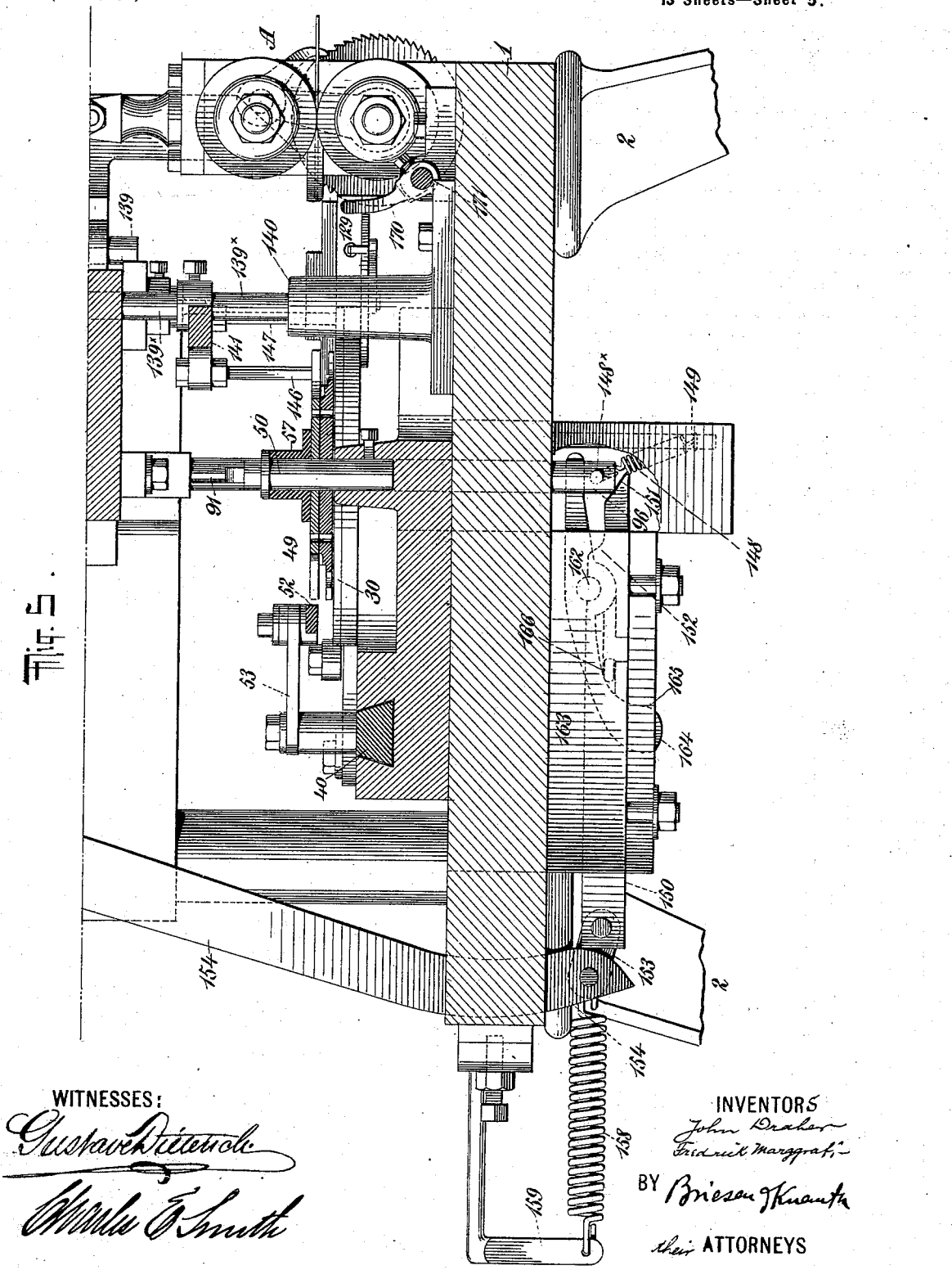

No. 654,612. Patented July 31, 1900.
J. DRAHER & F. MARGGRAFF.
METAL WORKING MACHINE FOR MAKING TACKS, &c.
(Application filed Feb. 24, 1899.)
(No Model.) 13 Sheets—Sheet 6.
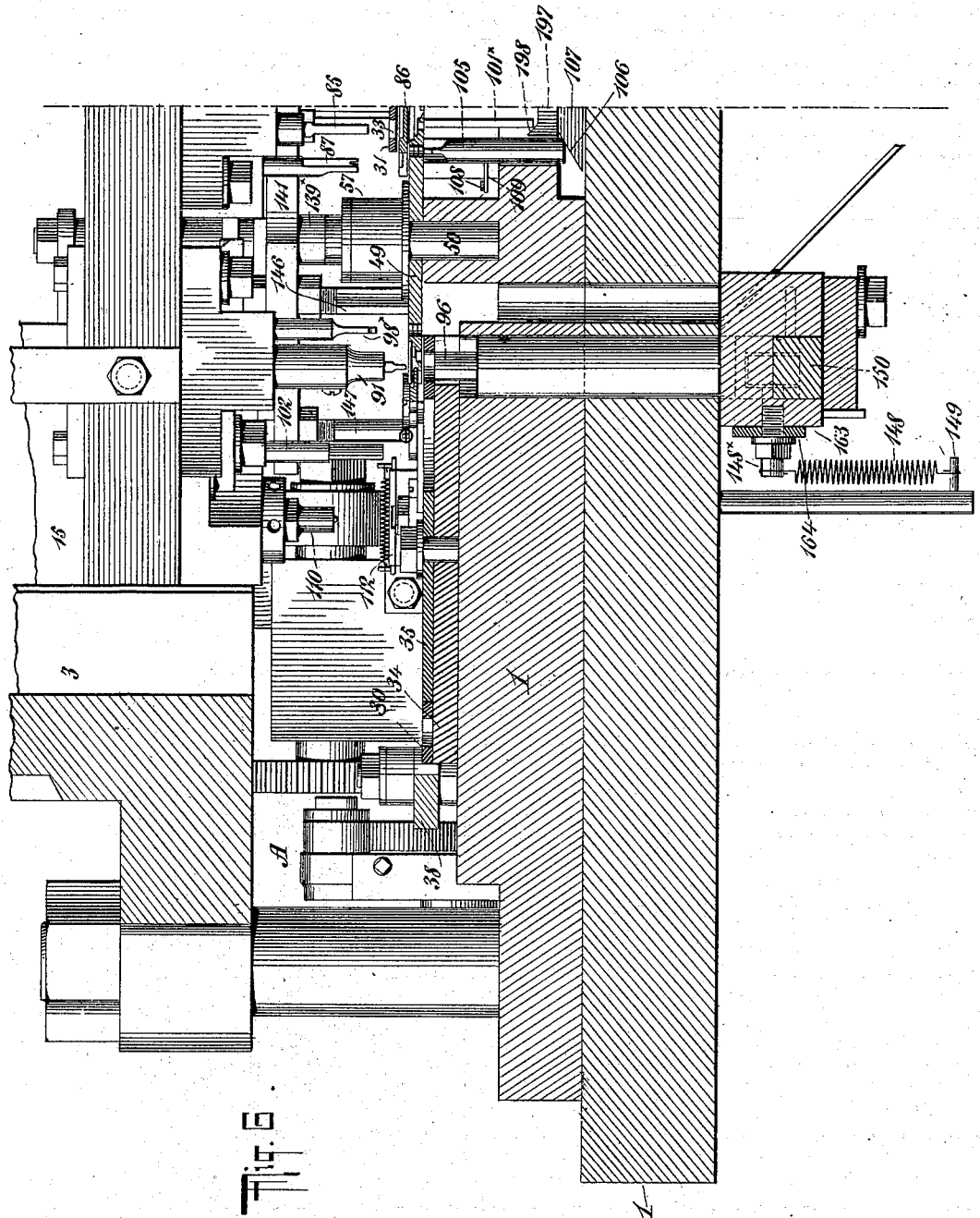
WITNESSES:
INVENTORS
John Draher
Frederick Marggraff
BY Briesen & Knauth
their ATTORNEYS No. 654,612. Patented July 31, 1900.
J. DRAHER & F. MARGGRAFF.
METAL WORKING MACHINE FOR MAKING TACKS, &c.
(Application filed Feb. 24, 1899.)
(No Model.) 13 Sheets—Sheet 7.
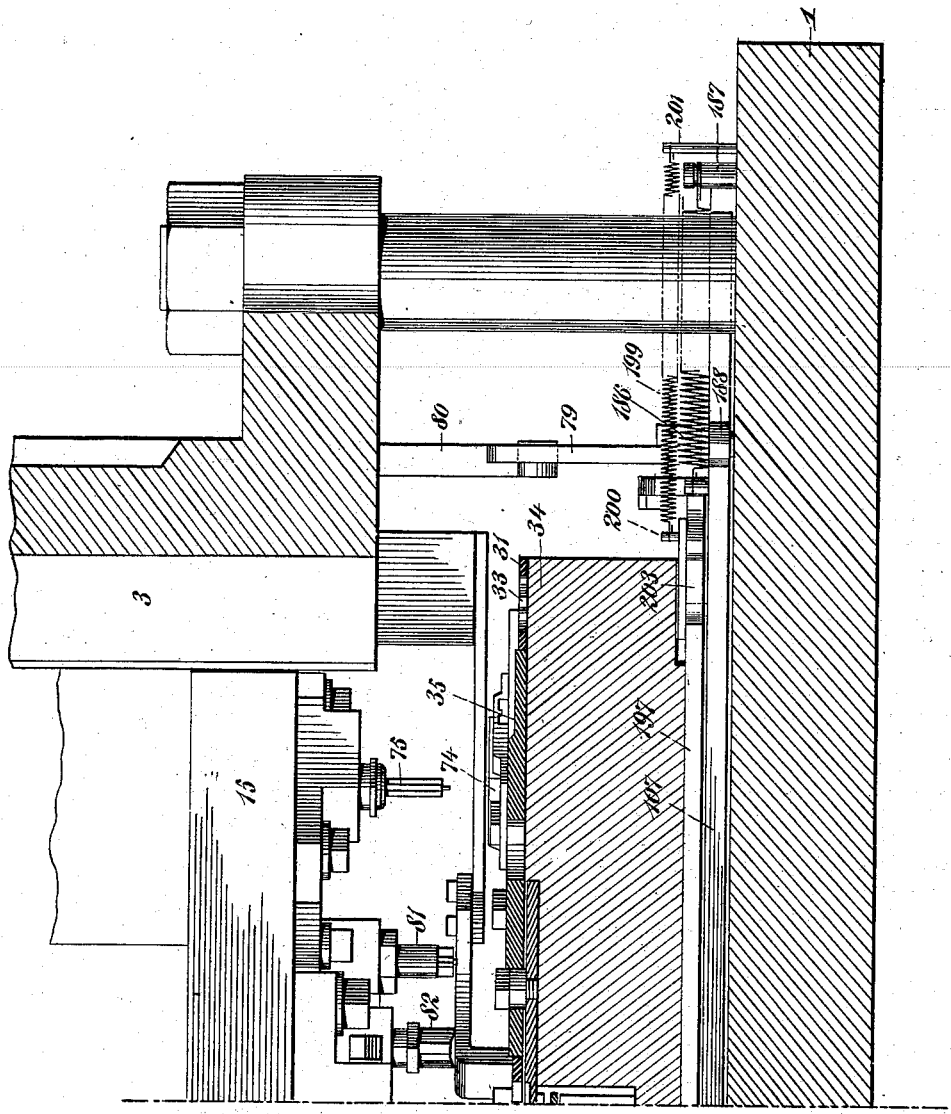

No. 654,612. Patented July 31, 1900.
J. DRAHER & F. MARGGRAFF.
METAL WORKING MACHINE FOR MAKING TACKS, &c.
(Application filed Feb. 24, 1899.)
(No Model.) 13 Sheets—Sheet 8.
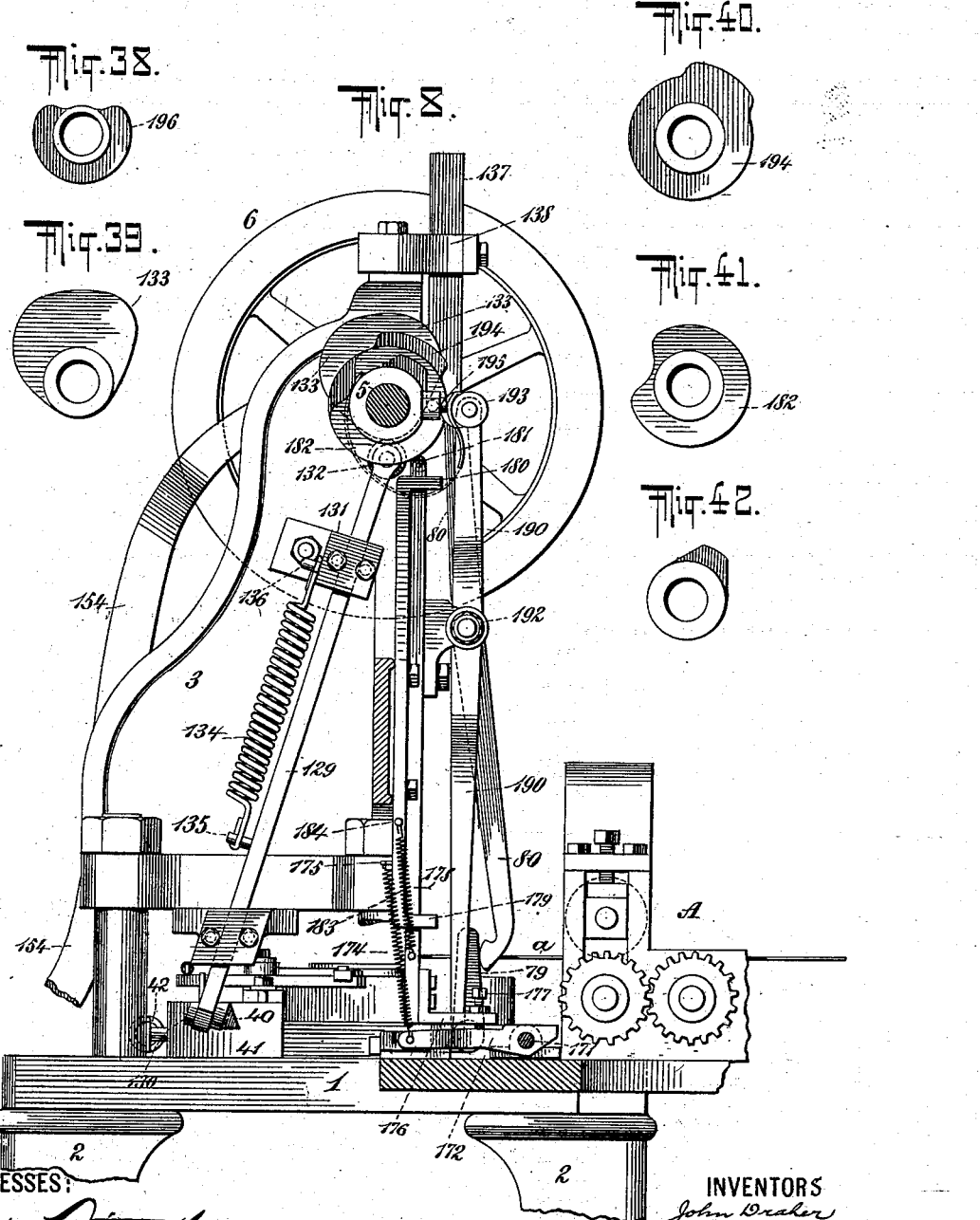

No. 654,612. Patented July 31, 1900.
J. DRAHER & F. MARGGRAFF.
METAL WORKING MACHINE FOR MAKING TACKS, &c.
(Application filed Feb. 24, 1899.)
(No Model.) 13 Sheets—Sheet 9.
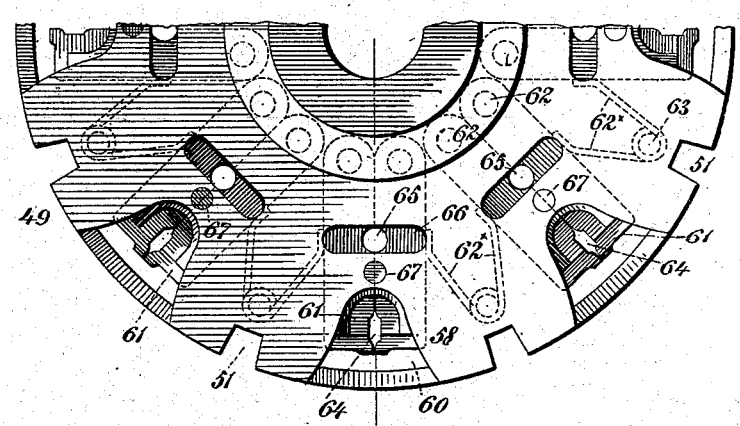
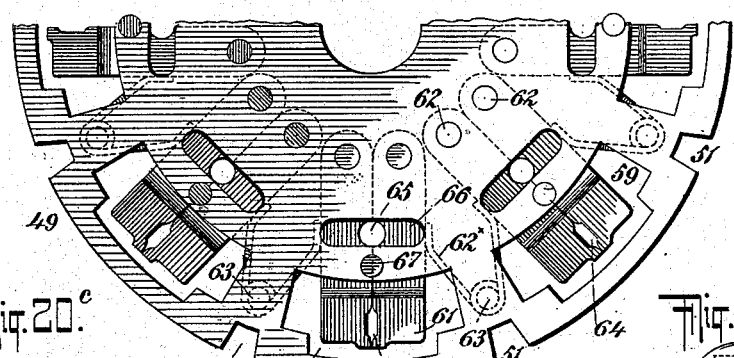
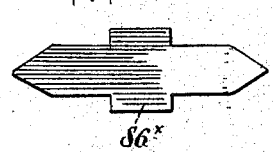
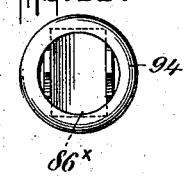
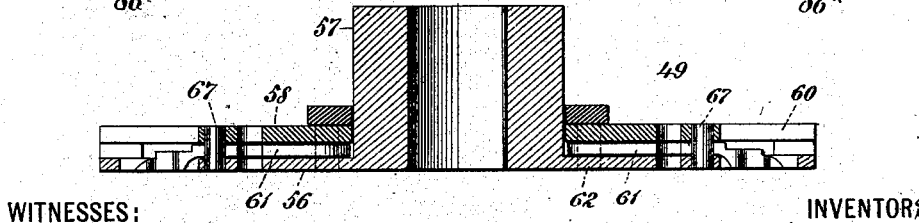
WITNESSES: INVENTORS
Gustave Dieterich. John Draher
Charles E. Smith Fredrick Marggraff
BY Briesen & Knauth
their ATTORNEYS

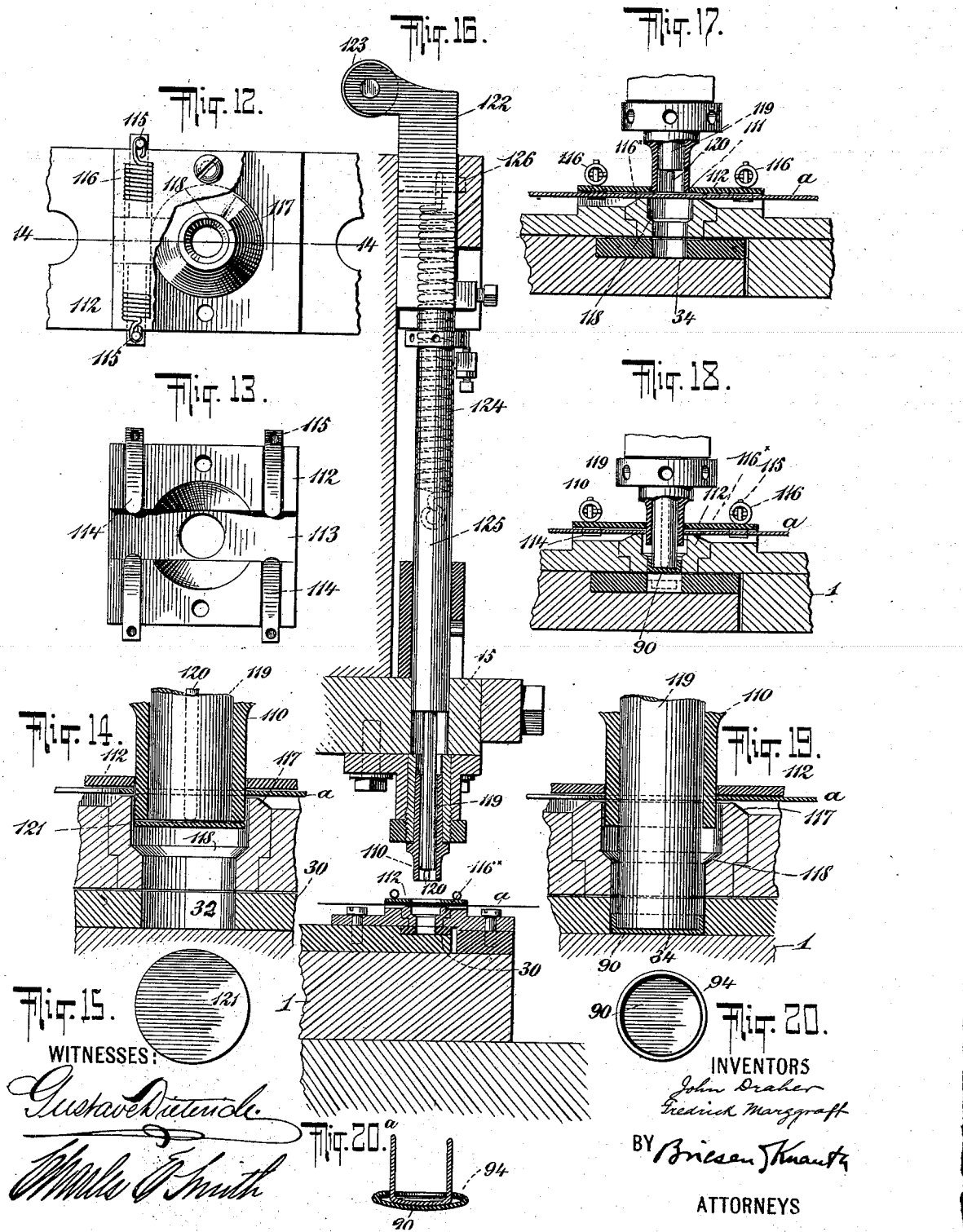

No. 654,612. Patented July 31, 1900.
J. DRAHER & F. MARGGRAFF.
METAL WORKING MACHINE FOR MAKING TACKS, &c.
(Application filed Feb. 24, 1899.)
(No Model.) 13 Sheets—Sheet 11.
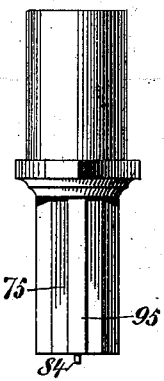
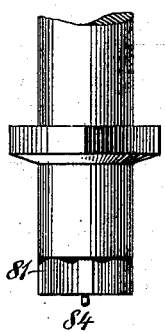
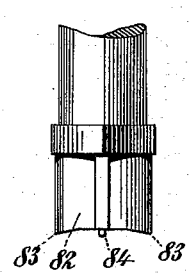
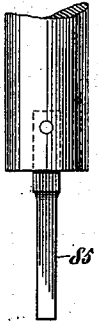
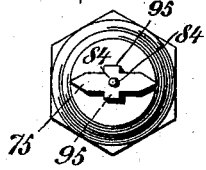
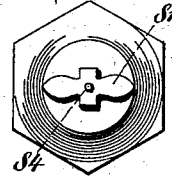
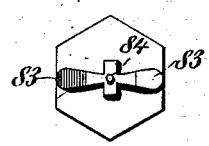
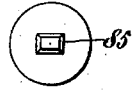
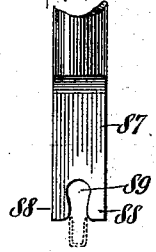
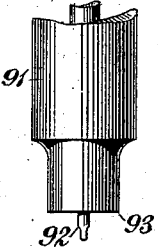
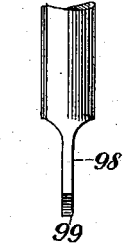
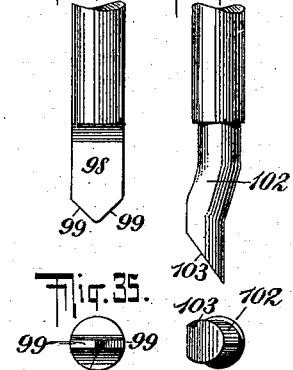
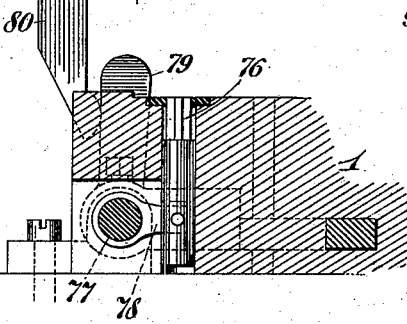
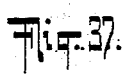
WITNESSES:
INVENTORS
ATTORNEYS

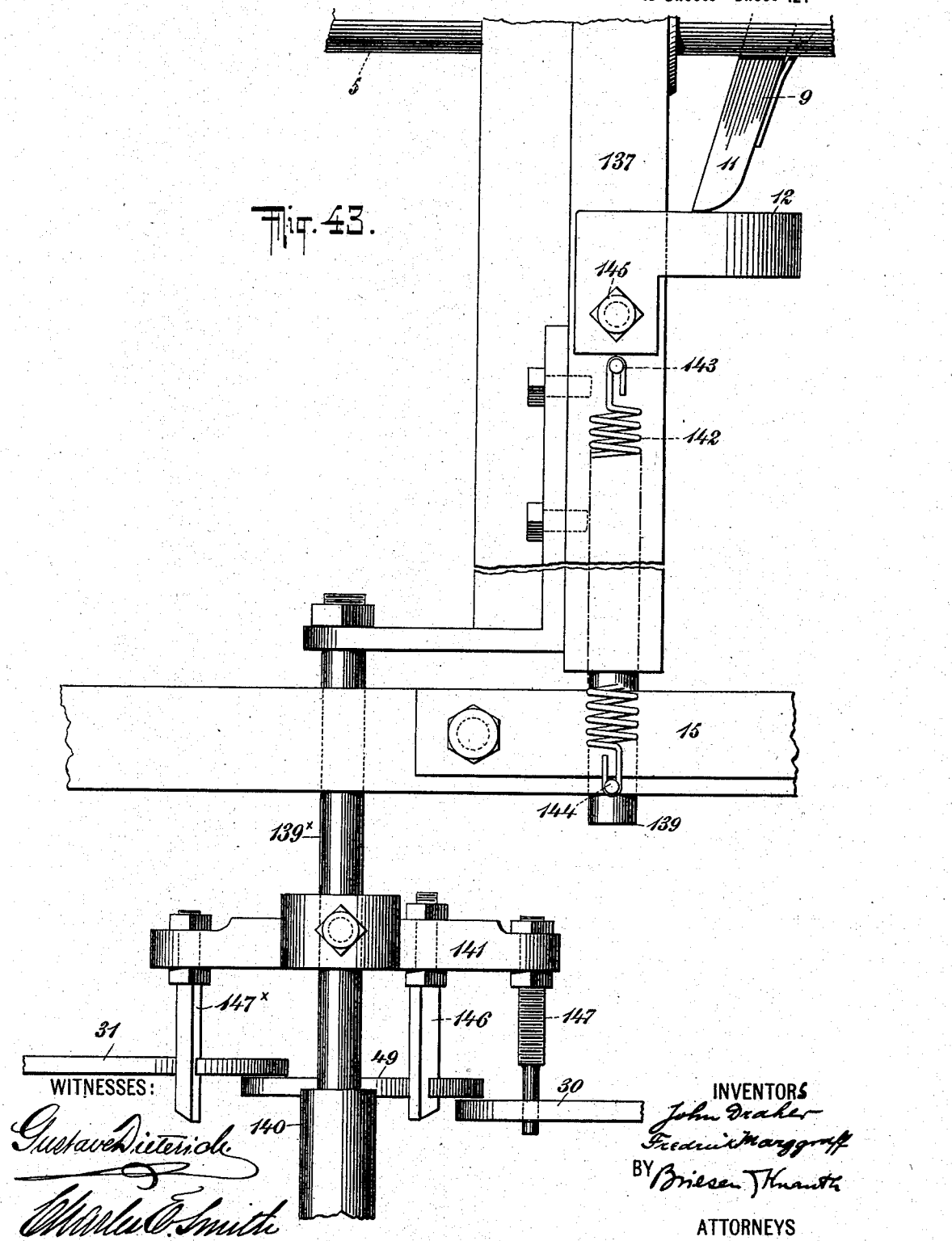

No. 654,612. Patented July 31, 1900.
J. DRAHER & F. MARGGRAFF.
METAL WORKING MACHINE FOR MAKING TACKS, &c.
(Application filed Feb. 24, 1899.)
(No Model.) 13 Sheets—Sheet 13.
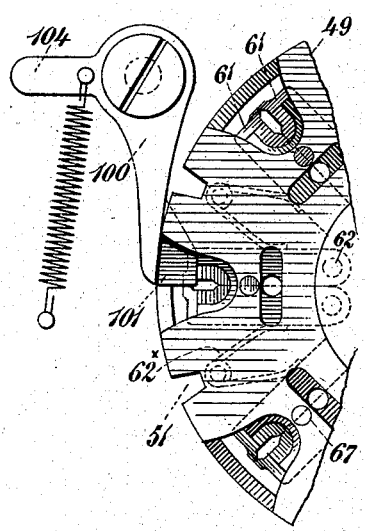
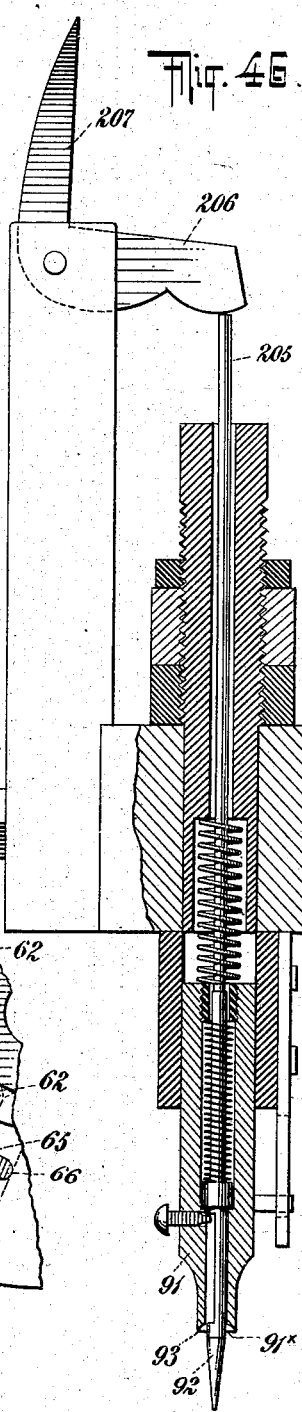
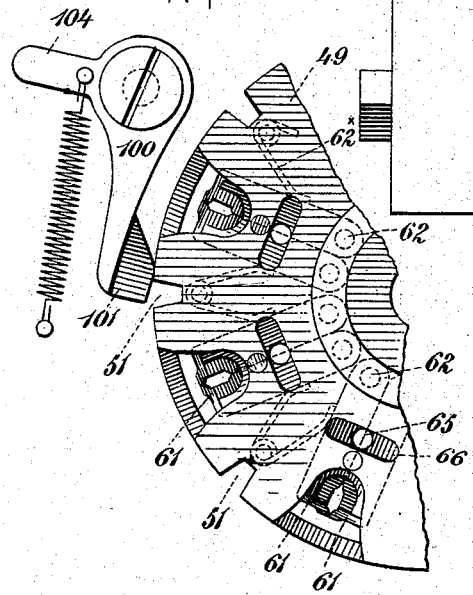
WITNESSES:
INVENTORS
John Draher
Frederic Marggraff
BY
Briesen & Knauth
ATTORNEYS

UNITED STATES PATENT OFFICE.

JOHN DRAHER AND FREDRICK MARGGRAFF, OF WATERBURY, CONNECTICUT, ASSIGNORS, BY MESNE ASSIGNMENTS, TO THE SHOE HARDWARE COMPANY, OF SAME PLACE.

METAL-WORKING MACHINE FOR MAKING TACKS, &c.

SPECIFICATION forming part of Letters Patent No. 654,612, dated July 31, 1900.

Application filed February 24, 1899. Serial No. 706,660. (No model.)

*To all whom it may concern:*

Be it known that we, JOHN DRAHER and FREDRICK MARGGRAFF, residing at Waterbury, New Haven county, State of Connecticut, have invented certain new and useful Improvements in Metal-Working Machines, of which the following is a full, clear, and exact description.

Our invention relates to metal-working machines generally, and the particular mechanism shown and described is employed for forming and stamping up separate sections of a tack or rivet and for uniting the separate parts to produce finished rivets.

The main object of our invention is to provide an efficient mechanism of the character described for automatically and continuously producing completed rivets and to so construct such mechanism that there is little liability of it being disarranged or broken during the operation of the machine or that imperfect rivets will be turned out on the machine.

To these ends our invention consists in the novel arrangement and combination of parts and to the various details of construction to be hereinafter described and claimed.

Figure 2:
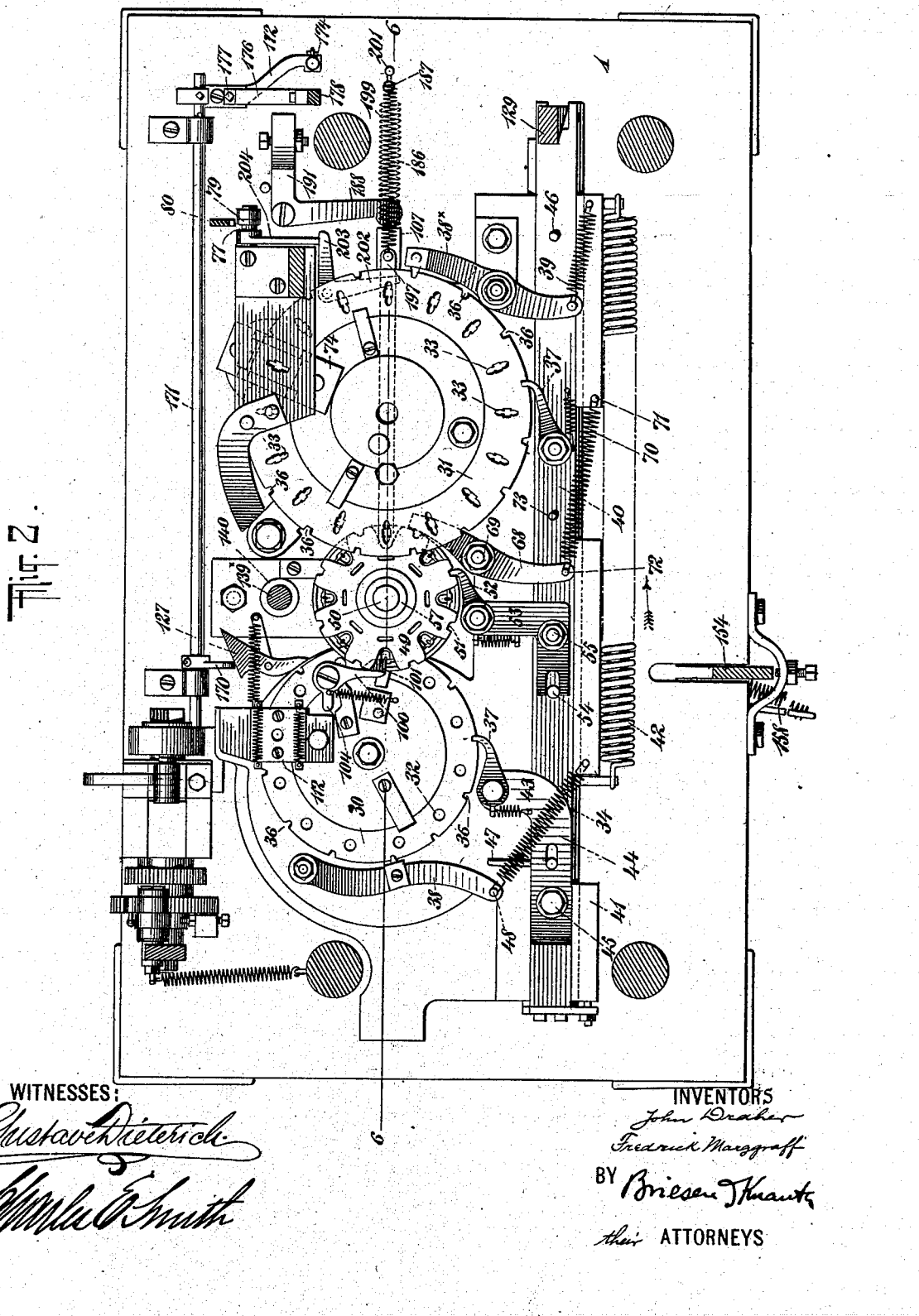

In the accompanying drawings, wherein like characters indicate corresponding parts in the various views, Figure 1 is a front elevation of a metal-working machine embodying our invention. Fig. 2 is a horizontal sectional view of the same with parts removed for the purpose of clearer illustration, the section being taken above the dial-plates on the line 2 2 of Fig. 1. Fig. 3 is a like view of a portion of the same with the automatic feed mechanism added. Fig. 4 is a vertical transverse sectional view of the upper portion of the machine, the view being taken on the line 4 4 of Fig. 1 and looking in the direction of the arrow. Fig. 5 is a like view of the lower portion of the machine, this latter view showing a continuation of the parts represented in the preceding figure. Fig. 6 is an enlarged longitudinal sectional view of one-half of the parts illustrated in Fig. 5, the view being taken on the line 6 6 of Fig. 2. Fig. 7 is a view similar to that represented in Fig. 6, the view showing the parts of the bed-plate and its coöperating mechanism which were omitted from the preceding figure, the parts in Fig. 7 beginning where the parts in the preceding figure left off. Fig. 8 is an end view of the machine with parts omitted for the purpose of clearer illustration, the view being taken from the direction of the arrow $z$ in Fig. 1. Fig. 9 is an enlarged fragmentary detail plan view of the transfer dial-plate to be hereinafter described. Fig. 10 is a bottom view of the same. Fig. 11 is a transverse sectional view of the same. Fig. 12 is a detail plan view, with portions broken away, of the combined blanking and drawing die and its coöperating parts. Fig. 13 is a bottom view of the shield and guide to be hereinafter described. Fig. 14 is an enlarged vertical sectional view of the blanking and drawing die shown in Fig. 12, together with the punches which directly coöperate therewith, the view being taken on the line 14 14 of Fig. 12. Fig. 15 is a face view of the initial blank for the cap. Fig. 16 is a detail sectional view of the parts represented in Fig. 14 and the mechanism for operating the punches. Fig. 17 is a view similar to that represented in Fig. 14, the parts being shown in a somewhat-different position. Fig. 18 is a like view of the same, showing the parts in still another position. Fig. 19 is an enlarged view of the same, showing the parts in the position they assume after the cap-section has been formed by the drawing punch and die. Fig. 20 is an enlarged bottom view of the cap-section of the tack. Fig. 20ª is a transverse sectional view of the completed tack or rivet. Fig. 20ᵇ is a bottom view of the same. Fig. 20ᶜ is an enlarged plan view of the blank of the tack-section as it is formed by the initial punch and die. Fig. 21 is a detail side view of the initial blanking-punch of the tack-section. Fig. 22 is an end view of the same. Fig. 23 is a side view of a forming-punch to press the prongs of the tack into a parallel position, as will be hereinafter described. Fig. 24 is an end view of the same. Fig. 25 is a detail side view of what we term a "dummy punch," which, in fact, is not a punch at all, as will hereinafter appear. Fig. 26 is an end view of the same.

Fig. 27 is a detail side view of a closing-punch to be hereinafter described. Fig. 28 is a transverse sectional view of a portion of the machine, showing the follower which coöperates with the initial blanking-punch and the parts by which said follower is operated. Fig. 29 is a detail side view of what we term a "pointing-punch," the object of which is to compress the metal at the points of the rivet, and thereby sharpen the same. Fig. 30 is an end view of the same. Figs. 31 and 34 are side views, taken at right angles to each other, of an opening tool to be hereinafter described. Fig. 32 is a detail side view of what we term the "setting-up" or "forming" punch, the purpose of which is to give a U form to the tack-section. Fig. 33 is a detail end view of the same. Fig. 35 is an end view of the opener represented in Figs. 31 and 34. Figs. 36 and 37 are side and end views, respectively, of an operating-tool for operating the tack-support, as will be hereinafter described. Figs. 38, 39, 40, 41, and 42 are detail side views of certain of the operating-cams to be hereinafter referred to. Fig. 43 is a diagrammatic view of a portion of the machine to be hereinafter described. Fig. 44 is an enlarged detail plan view of a tack-support, together with a portion of the transfer-plate with which the same coöperates. Fig. 45 is a like view of the same, the parts being shown in different positions from those in the foregoing figure. Fig. 46 is an enlarged detail sectional view of the closing-punch and its operating mechanism. Fig. 47 is a detail view of the pin of the closing-punch.

In order that a general understanding of the invention and the ends to be attained thereby may be had, we will first give a general description of the machine and its operation, which is illustrated in the accompanying drawings, the same indicating one form or embodiment of our invention.

The metal strips from which the blanks are to be cut and formed are intermittently fed to suitable blanking-punches by automatically-operated feed mechanism. Each of these blanking-punches coöperates with one of the two blank-feeding plates or, as we term them, "dial-plates," by means of which the blanks are automatically fed to successive punches which coöperate therewith. A third or transfer dial-plate coöperates with the other two to automatically transfer a finished blank from one of said feed-plates into juxtaposition to a blank carried by the other feed-plate, where a closing-punch is brought into operation and the two separate parts of the rivet are united. The various parts of the machine are automatic and continuous in their operation, and special means are provided to automatically stop the machine when the parts fail to operate properly or when there is any liability of injury resulting to the machine from any improper positioning of a blank in the machine.

By reference to Fig. 1 of the drawings it will be observed that 1 designates a suitable bed-plate, which may be mounted upon legs 2. Supported upon the bed-plate 1 is a frame which comprises upright side standards 3, which are united at the top by a cross-head 4. In this frame 3 4 most of the moving parts of the machine are mounted. Thus, for instance, the main shaft 5 is mounted in suitable bearings in the standards 3, and this main shaft is provided with a driving-pulley 6, from which project laterally-extending pins 7, spaced apart for the reception of one end 8 of a spring-pressed latch 9, which constitutes one member of a two-part clutch. This clutch-section is pivoted, as indicated at 10, in an aperture extending through the main shaft 5, and the opposite end 11 of said clutch-section is adapted to be brought into contact with a cam-abutment 12 when the latter is moved into the path thereof during its revolution with the main shaft. Connected to suitable eccentrics on the main shaft 5 are pitman-rods 13, as indicated at 14. The opposite ends of these pitman-rods 13 are pivoted to a movable gate or cross-head 15, as indicated at 16, and the said pitman-rods 13 are each of them preferably made in two sections, which are right and left hand screw-threaded and are united by a capstan-screw $13^\times$. The cross-head 15 is suitably guided by the standards 3—as, for instance, by means of lugs $16^\times$—and said cross-head carries all of the punches except the final uniting or closing-punch, which is operated in a manner to be hereinafter described.

There are series of punches for each part of the article to be produced. Thus in the present instance there are two parts, one which constitutes the head of the rivet or tack and the other the tack-section proper. A metallic strip $a$ (see Fig. 3) is automatically fed to the blanking punch and die for each part by any suitable automatic feed device A. In the present instance we have shown a feed device which is substantially the same as that shown and described in the patent to Fredrick Marggraff, No. 252,786, dated January 24, 1882. We will therefore only give a brief description of such feed mechanism in order that the general construction and operation thereof in conjunction with the machine forming the subject-matter of the present invention will be understood.

Upon the main shaft 5 is carried a head 17, which contains a longitudinal groove, (not shown,) in which a slide 18 may be adjustably secured. This slide 18 carries a pivot which constitutes a wrist-pin that is connected to a link 19 and is extended to form a bearing for a slotted yoke 20, which yoke may be adjusted on said wrist-pin by means of a nut 21. To the yoke 20 is connected, by means of a universal joint 22, a rod 23. It will be observed that by this means an adjustment of the throw of the link 19 and the rod 23 may be made. The link 19 connects with a slide 24, which moves in a bracket 25, extending from one of the upright standards 3 of the machine. The lower end of this slide 24 is connected to links 26, which are adapted to transmit motion to a suitable pinion (not shown) which meshes with the rack-bar 27, which is connected to a feed-carriage 28 (see Fig. 3) to automatically move the same in a direction transverse to the direction of longitudinal feed of the metal strip $a$. The rod 23 is connected at its lower end to a suitable pawl-and-ratchet mechanism, by which motion is transmitted to a shaft 29 of the feed device, and this shaft imparts a rotary motion to suitable feed-rollers, which bear upon the strip $a$ and feed it in a longitudinal direction. This feed mechanism A is automatically operated to intermittently move the metal strip $a$ any suitable number of times in a direction transverse to its length. After it has imparted a sufficient number of movements to the carriage to have stamped or punched the metal throughout the width of the strip the feed-rollers are automatically brought into operation to feed the metal longitudinally a distance a little greater than the length of a blank to be cut. The carriage will then be moved intermittently and transversely in an opposite direction from that in which it was initially moved, and so on the operation is repeated.

In the particular mechanism shown and described we employ two feed-plates 30 and 31, which we term "dial-plates." One of these feed plates is employed for each part of the structure. Thus a feed-plate 30 is employed for feeding the blanks which eventually constitute the head of the tack or rivet, whereas a dial-plate 31 is employed to feed the blanks of the tack portion proper of the rivet to be formed. Each of these dial-plates 30 31 comprises a ring provided with a series of tacks or apertures or pockets 32 33, respectively, which extend therethrough and conform in outline to the initial form given to the blank. These dial-plates are each mounted to rotate on a trackway, as indicated at 34 in Figs. 6 and 7 of the drawings, and a central disk 35 projects above the face of each of these trackways or the bed, which is flush therewith and constitutes a central plate around which a dial-plate revolves. The outer periphery of each of these dial-plates is provided with a series of regularly-spaced apertures 36, into which a spring-pressed pawl 37 is adapted to engage, as clearly represented in Fig. 2 of the drawings. Locking-pawls 38 38$^\times$ are provided, one engaging each of these dial-plates in a similar manner to that of the pawls 37. These locking-pawls are forced into engagement with the apertures 36 in the dial-plates by springs 39 when the apertures in said dial-plates are brought into register with the locking projections extending from said pawls, so as to maintain the dial-plates against movement when the feed-pawls 37 are not in operation to rotate the feed-plates. These feed-pawls 37 are pivotally connected to a slide 40, which is adapted to be reciprocated in a longitudinal direction by means to be hereinafter referred to. This slide 40 moves in suitable ways 41, formed in the framing of the machine, and is moved in the direction of the arrow in Fig. 2 by a spring 42. It will be observed on reference to Fig. 2 of the drawings that the pawl 37 for the dial-plate 30 is not mounted directly upon the slide 40, but is connected to a bracket 43, which is capable of being adjusted longitudinally upon the slide 40 by means of the pin-and-slot connection 44 and the screw 45.

Upon the right-hand end of the slide 40 is a vertically-projecting pin 46, which is adapted to engage the tail of the pawl 38$^\times$. A horizontally-extending pin 47 projects from the left-hand end of the slide 40 and is adapted to engage the lower portion of a pin 48, which extends to both sides of the pawl 38 and to the upper portion of which the spring of the pawl 38 is secured. In this manner it will be seen that when the slide 40 is moved toward the left the pins 47 and 46 will engage with the pawls 38 and 38$^\times$, respectively, and will cause the same to be forced out of engagement with their respective dial-plates before the spring-pressed feed-pawls 37 have been brought into engagement with the apertures in said dial-plates to intermittently rotate them at the next reciprocation of the slide 40 in an opposite direction. It will be seen that by this operation of the slide 40 the dial-plates are intermittently and simultaneously revolved to bring the apertures therein successively into alinement with the initial punches and dies, and as the blanks are formed they are deposited in the apertures of their respective dial-plates. The blanks are then fed by said dial-plates to the successive punches to be given the proper form, and after the blanks leave the last of the series of punches they are conveyed to a position where the blanks of one dial-plate must be transferred into juxtaposition to the blank in the other dial-plate and into the path of a closing-punch, where the parts are united to form a complete rivet or tack. This transfer of a blank from one dial-plate to a position where it may be combined with a blank of a second dial-plate comprises in the present instance a third dial-plate 49, which we designate as "a transfer device" or a "transfer dial-plate," which is mounted intermediate of the two feed-plates 30 31, as may be seen by an inspection of Fig. 2 of the drawings. We likewise mount the transfer-plate in such a manner that it will move or rotate in a plane intermediate of the planes of movement of the dial-plates 30 and 31, as indicated in Fig. 2 and in other views of the drawings. This transfer dial-plate 49 is pivoted upon a pintle 50, as indicated in Fig. 2, and is provided with a series of apertures 51 in the periphery thereof, as indicated in Fig. 2. Coöperating with this transfer-plate is a spring-pressed feed-pawl 52, which is adapted to engage in the apertures 51 in the periphery of the plate in a manner similar to that in which the feed-pawls 37 engage the dial-plates 30 and 31. This feed-pawl 52 is carried upon a bracket 53, which is adjustably secured to the slide 40 by means of a pin-and-slot connection 54 and a set-screw 55, as heretofore described in connection with the feed-pawl of the plate 30. By this means it will be observed that the feed-pawl 37 of the dial-plate 30 and the feed-pawl 52 of the transfer-plate may be adjusted with relation to each other and with relation to the feed-pawl 37 of the plate 31 so as to compensate for any wear or deviation that the parts might ordinarily present.

From the foregoing description it will be understood that the transfer-plate is moved intermittently and simultaneously with the feed-plates 30 and 31 at each operation of the slide 40. This transfer-plate is illustrated in detail in Figs. 9, 10, and 11, from which it will be seen that a main plate 56 is provided with a sleeve 57, and said main plate, together with the plate 58, which is secured thereto, constitutes a frame or spider, which is perforated and apertured, as indicated at 59 and 60. Between these plates 56 and 58 are contained arms 61, which are pivoted, as indicated at 62, in a manner to form adjacent clamping-arms, the ends of which project into the indentures, spaces, or apertures 59 60 formed in the spider. The arms 61, constituting each coöperating pair, are maintained in contact with each other by springs $62^x$, which are coiled around the posts 63 between the plates and have their free ends abutting upon adjacent arms 61, as indicated in Figs. 9 and 10. Between each pair of arms 61 is provided a tack-receiving aperture 64 and an opening aperture 65. Access may be had to the opening aperture 65 of each pair of clamping-arms 61 through an elongated opening 66 in the top and bottom plates 58 and 56, respectively, of the frame. The movement of each pair of clamping-arms 61 toward each other is limited by a pin 67, which extends from the top to the bottom plate. The purpose of the clamping-arms 61 is to receive a tack-section from the dial-plate 31 and to maintain it in position between a pair of said arms until it is brought in juxtaposition to the cap-section or top of the tack carried by the dial-plate 30, where the two parts will be combined to form a complete tack or rivet. The manner in which these spring-pressed clamping-arms 61 are operated will be hereinafter more fully described. Like the dial-plates 30 and 31, this transfer-plate 49 has a locking-pawl 68, which is pivoted, as indicated at 69, and will engage in one of the apertures 51 in the periphery of the transfer-plate when the parts are in position to cut the blanks for each of the feed-plates. This pawl 68 is maintained in engagement with the transfer-plate by a spring 70, secured by one end to a fixed portion 71 of the framing of the machine and at the opposite end to the tail of the pawl, as indicated at 72. A suitable pin 73, which projects vertically from the slide 40, is adapted to engage the tail end of this locking-lever when the slide is moved toward the left, so as to release the lever in a manner similar to that in which the locking-levers 38 $38^x$ are released.

Having described the dial-plates and the manner in which the same are operated, we will now proceed to describe the various punches and dies which coöperate with each of the feed-plates for the blanks to be united to form a finished tack or rivet.

Upon reference to Figs. 3 and 7 of the drawings it will be observed that a fixed die 74 extends over the dial-plate 31 and that the aperture in this fixed die corresponds in outline to the outline of the initial blank to be cut and to the apertures or pockets 33, contained in the dial-plate 31. The punch 75, which coöperates with this fixed die 74, is illustrated in detail in Figs. 21 and 22 of the drawings. Coöperating with this initial punch and die for forming the tack-section of the tack or rivet is what we term a "follower" 76, which is illustrated in detail in Fig. 28 of the drawings. This follower 76 has the general conformation of the initial blank for the tack-section represented in Fig. $20^c$ of the drawings. This follower is normally maintained in the elevated position by the spring thereof acting upon the parts connected thereto, as will hereinafter appear. These parts consist of a rock-shaft 77, from which an arm 78 projects, and this arm connects with the follower. Projecting from the rock-shaft 77 is a second arm 79, with which a rocking lever 80 coöperates to rock the shaft and to depress the follower against the tension of its spring. The lever 80 is operated in a manner to be hereinafter described to control the follower 76, which coöperates with the blanking-punch in the following manner: Before the punch 75 descends to cut the blank the follower 76 is pressed by its spring against the under face of the metal, the follower having passed through an aperture 33 in the feed-plate 31. When the blanking-punch 75 descends, it cuts a blank from the metal strip and forces the blank down with the follower against the tension of its spring until the upper end of the follower is flush with the trackway of the dial-plate 31. The lever 80 is then operated to maintain the parts in this position, as illustrated in Fig. 28 of the drawings. The dial-plate 31 then receives an intermittent movement to convey the blank along the plane face of the trackway to the next punch 81, which is illustrated in detail in Figs. 25 and 26 of the drawings. This punch 81 is, in fact, not a punch at all, but is what we term a "dummy" punch, and its function is merely to enter apertures in the dial-plate as they are brought successively to the dummy punch and to bear upon the blank contained therein to flatten out any bur that may project therefrom. The dummy punch is fixed to and moves up and down with the gate 15, and its object, aside from flattening out the blank, is to stop the machine in case more than one blank is accidentally contained in a pocket of the feed-plate. This is brought about by the dummy punch being regulated to descend to a predetermined depth in an aperture in the dial-plate. This depth is determined by the thickness of the metal of the blank cut by the blanking-punch 75. It will thus be understood that if by any accident two blanks should get in the same aperture in the dial-plate they will prevent the dummy punch from descending to the proper extent and will immediately stop the machine before injury can result thereto through a subsequent punch operating upon the two blanks instead of one. After the dummy punch has pressed upon the blank in the manner described the dial-plate is given an intermittent movement and conveys the blank along the trackway to the next punch 82, which is what we term a "pointing" or "sharpening" punch. This punch is illustrated in detail in Figs. 29 and 30, from which it will be observed that the portions 83, which bear upon the ends of the tack, extend below the face of the punch, so that they will compress or flatten the metal of the blank at these points and thereby render them sharp. It will be understood that the punches 81 and 82 coöperate with a plane or flat portion of the trackway of the dial-plate 31 and that no die other than this is used in connection with these punches.

In order that the punches 75, 81, and 82 may maintain the blanks properly positioned in the pockets or apertures 33 of the dial-plate with which they coöperate, each of said punches is provided with a spring-pressed longitudinally-movable finger 84, which normally projects from the face thereof. Each of these fingers may be provided with a spring somewhat in the manner of the finger or pin 92. (Shown in Fig. 46.) By these means the fingers 84 are first brought into contact with the blanks in the pockets, when the punches descend, and a spring-pressure is thereby exerted upon the blanks to properly position the same before the punches reach contact therewith. After the punch 82 has operated upon the blank in the manner described the dial or feed plate 31 is given an intermittent movement to convey the blank thus treated into the path of the drawing-punch 85, which is illustrated in detail in Figs. 32 and 33 of the drawings. When the blank arrives at this punch, the blank is cruciform and flat in shape, as indicated in Fig. 20$^c$. As the punch 85 descends it contacts with the middle of the blank and forces it through a fixed die 86, (see Fig. 6,) interposed between the dial-plate 31 and the transfer-plate 49. This fixed die 86 contains an aperture which corresponds to the cross-section of the drawing-punch 85, with which said die coöperates, so that after the blank is operated upon by this punch and die it is given a U-shaped form, with small lugs or projections 86$^\times$ extending laterally from the base thereof. When the parts are in position for the formation of this last-named blank, one of the tack-receiving apertures 64 between the clamping-arms 61 of the transfer-plate 49 will be beneath and in register with the punch 85 and the die 86 and will receive the blank from the said punch and die. The clamping-arms 61 will maintain the blank in place in the transfer-plate, and when the transfer-plate is next intermittently moved it will transfer the blank to a position where a bending-punch 87 can operate thereon. This punch 87 is illustrated in detail in Figs. 23 and 24 of the drawings, and the purpose thereof is to bend the points of the tack in toward each other, so that a parallelism is given to the prongs. Thus the ends 88 of the punch bear upon the points of the tack, as indicated in Fig. 23 of the drawings, and a depression of the punch will cause the prongs of the tack to pass into the aperture 89 between the parts 88 of the punch, and thereby slightly bend said prongs inwardly toward each other. At the next intermittent movement of the transfer mechanism or dial-plate 49 the blank treated in the manner described will be conveyed into register with an aperture or pocket 32 in the feed-plate 30. In this pocket a finished cap or head blank 90 (see Fig. 20) is contained, and coöperating with a pocket at this point is a closing-punch 91, which is illustrated in detail in Figs. 27 and 46 of the drawings. This closing-punch is provided with a spring-pressed pin 92, like the punches 75, 81, and 82, to bear upon the U-shaped tack-section and maintain it properly positioned in the head or cap section before the punch proper reaches contact therewith. It will be understood that the face of the punch 91 is properly recessed, as indicated at 91$^\times$, Fig. 46, to receive the prongs of the blank, and the circular flange or edge 93 is adapted to bear upon the upturned edge 94 of the cap (see Fig. 20) and to coöperate with its closing-die to turn the edge in and to bend it down upon the laterally-extending lugs 86$^\times$ of the tack-section formed by the parts 95 of the blanking-punch 75. (See Figs. 20$^b$, 21, and 22.)

The closing-die 96 is illustrated in Fig. 6 of the drawings. This die has the general conformation of the cap-blank, which is conveyed thereto by the feed-plate 30, and is automatically operated by means to be hereinafter described, so as to be projected through the trackway 34, where it registers with the apertures 32 as they are brought successively thereto by the dial-plate 30.

It will be observed that by mounting the feed-plates 30 and 31 so as to move in different planes and mounting the transfer-plate 49 so as to move in a plane intermediate of the planes of movement of the feed-plates 30 and 31 the transfer-plate is adapted to receive a blank from above from the feed-plate 31 and to deliver said blank to the feed-plate 30 below the plane of movement of the transfer-plate. Thus the different movements of the blanks in their transfer from one plate to another is always in a downward direction.

When the two blanks, one for the head and the other for the tack section, arrive at the closing-punch 91 to unite the parts, as has been described, the tack-section should be released from the clamping-arms, and in order to accomplish this we provide the following mechanism: Upon the gate 15 is carried an opening arm or plunger 98, which is shown in detail in Figs. 34 and 35 of the drawings. When the gate descends, the end of this opener 98 passes through an opening 66 in the top of the transfer dial-plate 49 and enters an aperture 65, formed between two of the clamping-arms 61. The cam edges 99 of the opener bear upon the arms 61 and force them apart against the tension of their springs $62^\times$. In order that the blank will not immediately drop from the clamping-arms 61 to the closing-die, but will be supported in place until such time as the closing punch and die are ready to act thereon, we provide what we term a "tack-support," which consists of a spring-pressed pivoted bell-crank lever 100, as indicated in Fig. 2 of the drawings, which bell-crank lever carries a supporting-flange 101, which is forced by the spring of the lever 100 under the transfer-plate, so that when a blank is released from the clamping-jaws of said plate it will rest upon the flange 101 and will be supported thereby until the closing punch and die are about to act thereon. The removal of the support from under the tack-blank is brought about in the following manner after an aperture 32, with a cap-blank contained therein, has been conveyed into the path of the closing-punch: The operating tool or plunger 102, which is illustrated in detail in Figs. 36 and 37 of the drawings, is carried by the gate or cross-head 15, and as the said cross-head descends it carries the cam-face 103 of said tool into contact with the arm 104 of the supporting-lever, and thereby forces the lever around its pivot against the tension of the spring thereof, and the flange 101 of the support is thus withdrawn from under the tack-section. In this manner the tack-section is at the proper time delivered to the die of the closing-punch, so that the two parts may be united. A tack-support $101^\times$, (see Fig. 6,) similar to that just described, may likewise be provided for the transfer-plate at that portion thereof where the tack-blank is delivered to it, and an opening tool or plunger 105, similar to that shown in detail in Figs. 34 and 35 of the drawings, is likewise employed. This opening-tool 105 is illustrated in Fig. 6 of the drawings, from which it will be seen that the lower end of the tool rests upon a cam-surface 106 of a laterally-moving slide 107. A leaf-spring 108 is adapted to bear upon a pin 109, secured to the tool 105 to insure the downward movement of said tool. This tool passes successively through the openings 66 in the under side of the transfer-plate 49 and coöperates with the spring-pressed clamping-arms 61 in the manner hereinbefore described to open them for the reception of a blank from the punch 85 and its coöperating die.

Having described the construction and operation of the various punches and dies which coöperate with the dial-plate 31 for the tack-section and the manner in which the tack-section is transferred by the dial-plate 49 to the feed-plate 30, we will now describe the various punches and dies which coöperate with the feed-plate 30 and the manner in which the same are operated.

The punch for blanking and drawing the cap is illustrated in detail in Fig. 16 of the drawings. This punch is in reality two punches, one within another. The outer or blanking punch is carried by and moves with the gate 15, while the inner or drawing punch is operated independently of the gate, as will hereinafter more clearly appear.

Upon reference to Figs. 12 to 19 of the drawings it will be seen that a blanking or cutting punch 110 is adapted to pass through an aperture 111 in a shield-plate 112. The purpose of this shield-plate 112 is to prevent the metal strip $a$, which passes under the shield, from following the cutting-punch as it is withdrawn from the die after the cut has been made. The shield is provided with a guide-channel 113 in the bottom thereof, (see Fig. 13,) through which the metal strip passes, and suitable guide-fingers 114 work in ways in the shield 112 and are adapted to bear laterally upon the metal strips and maintain them properly positioned. These fingers 114 are each provided with a pin 115, which extends outside of the shield, and the pins of each pair of fingers are united by a coiled spring 116, which extends over the top of the shield 112, as indicated in Fig. 12. Beneath the shield 112 is a fixed die $116^\times$, which is a combined cutting and drawing die, and this die is secured over the dial or feed plate 30, as indicated in Fig. 16 of the drawings, and the upper portion 117 of this die coöperates with the cutting or blanking punch 110, whereas the lower portion of said die from the circumferential shoulder 118 down constitutes a drawing-die with which the drawing-punch 119 coöperates. This drawing-punch is contained within and moves independently of the punch 110. The drawing-punch is provided with a spring-pressed finger 120, which normally extends from the face thereof and is adapted to bear upon the blank to properly position the same in the die before the drawing-punch 119 reaches contact with said blank. The punch 110 cuts a blank 121 of the form illustrated in detail in Fig. 15 of the drawings, whereas this blank is afterward given the form illustrated in detail in Fig. 20 of the drawings by the drawing-punch 119. A slide 122 is provided with an antifriction-roller 123, upon which a cam, to be hereinafter described, operates to depress the slide 122, and thereby transmits motion to the drawing-punch 119, which is maintained in the normal or retracted position by a spring 124. The punch 110 first descends with the gate 15 to cut the blank 121, as indicated in Figs. 14 and 17 of the drawings. The cutting-punch will now be arrested and a downward movement of the slide 122 will force the drawing-punch 119 down against the blank, the spring-pressed pin 120 of said drawing-punch being first brought to bear against said blank to maintain it in proper position in the die. A further downward movement of the drawing-punch will give a cup-shaped form to the blank, as represented in Fig. 18 of the drawings. When the drawing-punch descends to its lowest position, the blank will have been forced through the die or the combined cutting and drawing die into an aperture or pocket in the feed-plate 30, as indicated in Fig. 19 of the drawings, where the spring-pressed pin 120 prevents it from being elevated with the drawing-punch when the latter recedes. The drawing-punch 119 for the cap is carried to the elevated position by a spring 124, (see Fig. 16,) which is secured at one end to the slide 125 and at the other to a fixed portion of the machine, as indicated at 126. The feed-plate 30 then continues to be intermittently rotated to bring the blank into the path of the closing punch and die 91 and 96, respectively, which are operated in the manner described to unite the two blanks to form a complete tack or rivet. After the rivet has been completed it is carried around with the feed-plate 30 until it reaches an automatically-operated spring-pressed throw-out 127, which will be operated at this moment, by means to be hereinafter described, to throw out or discharge the finished tack into a suitable receptacle. (Not shown.)

Having described the construction of various parts of the machine which illustrate one form or embodiment of our invention and the manner in which these parts are operated, we will now describe the means for moving these parts.

Most of the parts are operated from cams carried upon the main shaft 5 of the machine. Thus the slide 40, which imparts motion to the overlapping feed-plates 30, 49, and 31, is reciprocated against the tension of its spring 42 (see Figs. 1, 2, and 8) by an inclined edge 128 (see Fig. 1) on the slide 129. The slide 40 carries an antifriction-roller 130, against which the inclined edge on the slide 129 is adapted to bear. The slide 129 moves longitudinally on suitable guides 131 and is provided at its upper end with an antifriction-roller 132, against which a cam 133 on the shaft 5 is adapted to bear. This cam is illustrated in detail in Fig. 39 of the drawings. This slide is elevated by a spring 134, secured at one end to the slide, as indicated at 135, and at the other end to a fixed portion of the framing, as indicated at 136. At each rotation of the main shaft a reciprocating movement is thus imparted to the slide to intermittently rotate the three dial-plates simultaneously and to an equal extent.

We have hereinbefore made reference to a dummy punch 81, the purpose of which is, among others, as before explained, to automatically stop the machine in case more than one blank is contained in a pocket in the feed-plate 31. It will be obvious that the same result will be produced if for any reason each of the pockets in the feed-plate 31 is not brought into exact register with its coöperating punch, inasmuch as the dummy punch will bear upon the upper face of the feed-plate and being in this manner prevented from descending to the predetermined extent will, as before described, immediately stop the machine before the succeeding punches have an opportunity to operate upon the two blanks instead of one.

We will now describe another form of automatic stop mechanism and the manner in which the same is operated.

Upon reference to Figs. 4 and 5 of the drawings, each of which shows continuations of the parts represented in the other figure and which should therefore be considered together, it will be observed that a slide 137 is adapted to move in a vertical direction in a suitable guide 138, carried by the fixed cross-head 4 of the framing. To the lower end of this slide are secured guide-rods 139 and $139^\times$, which are adapted to move through apertures contained in the movable cross-head or gate 15, and the guide-rod $139^\times$ is shown in Fig. 5 as extending into a suitable guide-sleeve 140. Adjustably secured to this rod $139^\times$ is a frame 141, to which are secured what we term "clutch-operating plungers" 146, 147, and $147^\times$. The slide 137 has one end of a spring 142 connected thereto, as indicated at 143, and the other end of this spring is secured to the cross-head 15, as indicated at 144. By these means it will be seen that the slide 137, the frame 141, and the parts carried thereby will be elevated and depressed with the gate 15 as the same is operated by the pitman-rods 13 unless an obstruction sufficient to overcome the tension of the spring 142 is interposed in the path of the plungers, when these parts will be maintained against further downward movement. The movable abutment 12, (see Fig. 1,) hereinbefore referred to, is secured to the slide 137, as indicated at 145 in Fig. 43 of the drawings, and consequently moves up into or descends out of the path of the end 11 of the clutch-section 9 at each operation of the gate. The parts are so arranged that the abutment 12 will not be carried out of the path of the clutch-section until the plungers have reached the ordinary downward limit of movement, so that any obstruction which will prevent the movement of these plungers to their full limit will maintain the abutment in the path of the clutch-section and will automatically release the clutch before the punches have time to descend to their full limit to destroy the machine or injure the punches.

The clutch-operating plungers 146, 147, and 147×, carried by the frame 141, are best illustrated in Figs. 1, 5, and 43 of the drawings. The clutch-operating plunger 146 coöperates with the transfer dial-plate 49. If the aperture between a pair of clamping-arms of the transfer-plate has been brought into exact register with the closing punch and die, the said plunger 146 will pass through one of the apertures 51 in said plate, or any other aperture provided for this purpose, on the downward movement of the gate 15 and the frame 141, carried thereby. If, however, the transfer-plate has not been properly fed to bring the parts into the relative position described, the plunger 146 will be prevented from passing through one of the apertures 51 in the dial-plate 49 and the abutment 12 will be maintained in the path of the clutch-section 9 to stop the machine, in the manner hereinbefore described. This clutch-operating plunger 147 coöperates with the feed-plate 30 and is adapted to pass successively into the pockets 32 thereof and to operate, in the manner described in connection with the plunger 146, to automatically stop the machine in case the feed-plate is not properly fed or more than one blank is contained in a pocket. The clutch-operating plunger 147× coöperates with the feed-plate 31 in the same manner as the plunger 146 coöperates with the transfer-plate 49. By this automatic stop mechanism, which might be termed a "justifying mechanism combined with a stop mechanism to automatically stop the machine," we provide against the possibility of accident to the machine when in operation from a source from which injury is most liable to occur.

We will next describe the means by which the closing-die 96, which coöperates with the closing-punch 91 to unite the two sections of the blank, is operated.

Upon reference to Figs. 5 and 6 of the drawings, it will be observed that the vertically-movable die 96 projects below the bed-plate 1 of the machine and that a spring 148 is secured to a pin 148× thereon at one end, while the other end of said spring is secured to a fixed point, as indicated at 149, to withdraw the die to its lowest position. Coöperating with the die 96 is a slide 150, which is provided at one end thereof with cams 151 and 152, which are adapted to contact with the lower end of the die 96 to elevate the same. This slide 150 is connected by a link 153 to a lever 154, which is pivoted to the framing at 155, as indicated in Fig. 4 of the drawings. The upper end of this lever 154 carries an antifriction-roller 156, against which a cam 157 on the main shaft 5 is adapted to bear to force the upper end of the lever out, and thereby elevate the die 96. The lever 154 is forced in an opposite direction by a spring 158, (see Fig. 5,) which is connected at one end to a fixed bracket 159 and at its opposite end to the lower end of the lever 154. If, however, this spring should for any reason prove insufficient to withdraw the slide and the lower end of the lever 154, an internal cam 160 (see Fig. 4) upon the main shaft 5 will engage a pin 161, (see Fig. 1,) projecting from the upper end of the lever 154, and will positively force the parts into their proper position. Pivoted, as indicated at 162, to a frame 163, depending from the bottom of the bed-plate, is a lever 164. One end of this lever is adapted to contact with the pin 148×, carried by the die 96, while the opposite end of said lever is provided with a cam 165, against which a pin 166, carried by the slide 150, is adapted to bear. This device is what we term a "safety-latch," the object thereof being to force the die 96 down to the lowermost position in case the die becomes buckled and the spring 148 proves insufficient to draw the die down. It will be observed that when the die is drawn down by its spring the lever will be brought into contact with the pin 148× on the die and that it will only contact with said pin to positively move the die, when the die is unduly retained against movement, to its lowermost position. The two-step cam on the end of the slide 150 is for the purpose of giving two motions to the die 96. The first of these motions, produced by the cam-face 151, is for the purpose of raising the die until the upper end thereof is flush with the trackway of the feed-plate 30, so that the blank or shell will be properly positioned on the die without dropping down, and thereby incur the liability of the blank turning. The next upward movement of the die is produced by the cam-face 152, and the purpose thereof is to carry the shell or cap blank up to the tack-section for the subsequent union of the tack and cap, in the manner hereinbefore described.

The throw-out-operating lever 127, hereinbefore described, is operated by an arm 170, adjustably secured to a rock-shaft 171, as is illustrated in Figs. 2, 5, and 8 of the drawings. This rock-shaft 171 is mounted on the bed-plate 1 in the rear of the machine and is provided with an arm 172, adjustably secured thereto, as indicated at 173. The free end of this arm is secured to one end of the spring 174, the opposite end of which is secured to a fixed part of the machine, as indicated at 175 in Fig. 8 of the drawings. Coöperating with this arm 172 is a shoe 176, which carries a set-screw 177, that is adapted to bear upon said arm to depress the same, and thereby rock the shaft 171. This shoe 176 is carried upon a vertically-movable slide 178, which is guided by suitable guides 179 and 180 and carries an antifriction-roller 181 at its upper end, against which a cam 182 on the main shaft 5 is adapted to bear. This cam is illustrated in detail in Fig. 41 of the drawings. The slide has one end of a spring 183 secured thereto, and the opposite end of this spring is secured to a fixed portion of the machine, as indicated at 184, so as to exert a retractile force upon the slide and the parts connected thereto to normally maintain the same elevated. It will thus be understood that at each revolution of the main shaft the lowest portion of the cam 182 will be brought into the path of the roller on the slide and will permit the same to be momentarily elevated to operate the tack-support 127 in the manner hereinbefore described.

We will next describe the mechanism for operating the opening-tool 105, which is illustrated in Fig. 6 of the drawings. As before stated, the purpose of this opening-tool 105 is to separate the clamping-arms in the transfer-plate 49, so that they may receive a tack-blank from the feed-plate 31. As has been described, the opening-tool 105 is forced to the elevated position by a cam 106 on the slide 107. Upon reference to Fig. 3 of the drawings, it will be observed that this slide 107 is connected to one end of a spring 186, which has its other end secured to a fixed pin on the bed-plate, as indicated at 187. The tension of this spring is exerted to draw the slide in the direction of the arrow, whereas one arm 188 of the bell-crank lever, pivoted to the bed-plate of the machine, as indicated at 189, bears upon said slide and is adapted to force it against the tension of its spring. A lever 190 (see Fig. 8) is adapted to contact with the other arm 191 of this bell-crank lever in order to transmit motion thereto to force in the slide 107. The lever 190 is pivoted to the frame, as indicated at 192, and carries an antifriction-roller 193, against which a cam 194 is adapted to bear to operate the lever and the slide at each revolution of the main shaft 5. The cam 194 is illustrated in detail in Fig. 40 of the drawings.

We will next describe the means for operating the follower 176, which is illustrated in detail in Fig. 28 of the drawings and which, as before described, coöperates with the blanking-punch 75 for the tack-section to maintain the blank properly positioned in the pocket of the feed-plate in which it is contained.

As has before been described, the follower is operated by a lever 80, which is pivoted to the framing and is provided at its upper end with an antifriction-roller 195, against which a cam 196, (see Fig. 1,) illustrated in detail in Fig. 38 of the drawings, is adapted to bear. It will be seen that by these means motion is transmitted to move the follower 76 to the elevated position by positive pressure, whereas by reason of a spring connection, to be presently described, the follower will be forced down against the tension of a spring when the punch 75 descends.

We have hereinbefore described a tack-support which is automatically operated to support a blank of the tack-section when the same is forced from the feed-plate 31 to the transfer-plate 49 and when the opening-tool 105 is operated to open the clamping-jaws of the transfer-plate. Upon reference to Fig. 6 of the drawings it will be observed that the lower end of the vertically-movable tack-support $101^\times$ rests upon a horizontally-movable slide 197, which is provided with a cam 198, that is adapted to force the tack-support into the elevated position. The outer end of the slide 197 projects beyond the edge of the dial-plate 31, as represented in Fig. 2 of the drawings. This end of the slide is connected to one end of a spring 199, as indicated at 200, and the other end of the spring is secured to a pin 201, projecting from the bed-plate 1. One arm 202 of a bell-crank lever is operatively connected to move the slide 197 against the tension of its spring, while the other arm 203 of said lever is operated upon by an arm 204, secured to the shaft 77. It will thus be seen that the spring 199 will exert a retractile force to normally maintain the rock-shaft 77, the follower 76, (see Fig. 28,) and the slide 197 in one position, whereas the lever 80 will operate the parts against the tension of the spring in the manner hereinbefore described.

We will next describe the manner in which the closing-punch 91, that unites the two sections of the tack, is operated. As has been before stated, this punch is operated independently of the gate.

Upon reference to Figs. 1, 4, 5, and 46 of the drawings it will be seen that the spindle 205 of the punch 91 extends up through suitable guideways in the gate 15, in which is contained a suitable spring $205^\times$, which bears upon a collar 305 on the pin 92, and thus normally maintains the punch in the elevated position. One arm 206 (see Figs. 4 and 46) of an angle-lever is adapted to bear upon the upper end of this spindle 205, while the other arm 207 of said lever coöperates with a lever 208. The lever 208 is pivoted, as indicated at 209, and is provided with a set-screw 210 at its lower end, which set-screw constitutes the bearing-surface for contact with the arm 207 of the angle-lever 206 207, so as to regulate the throw thereof. The upper end of this lever is adapted to be operated upon by a cam 211, so that the punch 91 is depressed at each revolution by the main shaft 5, and the parts are restored to their normal position by their springs.

We will next describe the means for operating the slide 122, Fig. 16, by means of which the cutting-punch 110 and the drawing-punch 119 are operated.

Upon reference to Figs. 1 and 4 of the drawings it will be seen that a cam 212 is adapted to bear upon the antifriction-roller 123 of the slide 122 at each revolution of the main shaft 5 and that the spring 124, Fig. 16, will elevate the slide and the parts carried thereby.

It is thought that from the foregoing description the operation of the machine will be understood. However, we will briefly describe the operation thereof.

The metal being automatically fed to the blanking-punches 75 and 110 by the feed mechanism A, the blanks for the tack-section and the cap-section will be formed, and the tack-section will be automatically conveyed and transferred, in the manner hereinbefore described, to the transfer-plate 49. The blank of the tack-section will then be transferred by the transfer-plate to the closing-die 96, to which a blank of the cap-section has previously been delivered by the feed-plate 30. The closing punch and die 91 and 96, respectively, are next operated and the two blanks will be united to form a complete tack or rivet.

It will be observed that the machine is constructed throughout so as to assure an accuracy of operation and a perfect formation of the finished articles. It will likewise be observed that in every instance throughout the construction of the machine where there is any liability of an undue obstruction being interposed in the path of a movable part of the machine the said part is either spring-pressed in the direction in which said obstruction is liable to occur or means are provided to automatically stop the machine before the said moving part has a chance to contact with the obstruction, and there is therefore no liability of injury to the machine from a source from which injury would ordinarily most frequently occur.

While we have shown and described with considerable detail the construction and operation of one form of machine embodying our invention, we would have it understood that many changes in construction and mode of operation may be made without departing from the spirit of our invention in order to adapt the invention to the manufacture of articles of different construction and configuration from that shown and described.

Having described our invention, what we claim, and desire to secure by Letters Patent, is—

1. In a metal-working machine, the combination of a blanking-punch and a fixed die therefor, a rotary transfer-plate, means for conveying a blank from the fixed blanking-die to said transfer-plate and an assembling-punch into the path of which the transfer-plate is adapted to convey a blank.

2. In a metal-working machine, the combination of a blanking-punch and a fixed die therefor, a rotary blank-receiving transfer-plate, means for intermittently rotating said plate, means for conveying a blank from the fixed blanking-die to said transfer-plate automatically and an automatically-operated assembling-punch into the path of which the transfer-plate is adapted to convey a blank.

3. In a metal-working machine, the combination of a rotary transfer-plate and a movable feed-plate having a series of blank-receiving apertures therein, said feed-plate being adapted to convey a blank to said transfer-plate.

4. In a metal-working machine, the combination of a rotary transfer-plate, means for feeding blanks thereto, a uniting or closing punch adapted to coöperate with said transfer-plate, and means independent of the transfer-plate for feeding blanks to the uniting-punch.

5. In a metal-working machine, the combination of a rotary transfer-plate, a movable feed-plate adapted to convey a blank to said transfer-plate, a uniting or closing punch adapted to coöperate with said transfer-plate and a second feed-plate adapted to convey a blank to said uniting-punch.

6. In a metal-working machine, the combination of a rotary transfer-plate, a rotary feed-plate having a series of blank-receiving apertures therein, said feed-plate being adapted to convey a blank to said transfer-plate, a uniting or closing punch adapted to coöperate with said transfer-plate and a second rotary feed-plate adapted to feed a blank to said uniting-punch.

7. In a metal-working machine, the combination of a rotary transfer-plate, a rotary feed-plate having a series of blank-receiving apertures therein, said feed-plate being adapted to convey a blank to said transfer-plate, means for forcing a blank from said feed-plate into the transfer-plate and a uniting or closing punch adapted to coöperate with said transfer-plate.

8. In a metal-working machine, the combination of a rotary transfer-plate, a rotary feed-plate having a series of blank-receiving apertures therein, said feed-plate being adapted to convey a blank to said transfer-plate, means for forcing a blank from said feed-plate into the transfer-plate, a uniting or closing punch adapted to coöperate with said transfer-plate and a second rotary feed-plate adapted to feed a blank to said uniting-punch whereby the two blanks are brought together and united.

9. In a metal-working machine, the combination of a rotary transfer-plate, a feed-plate coöperating with said transfer-plate to deliver blanks thereto, a blanking punch and die coöperating with said feed-plate, a second feed-plate coöperating with the transfer-plate to receive a blank therefrom and an assembling punch and die coöperating with this last-named feed-plate.

10. In a metal-working machine, the combination of a rotary transfer-plate, a feed-plate coöperating with said transfer-plate to deliver blanks thereto, a punch and die coöperating with said feed-plate, a second feed-plate coöperating with said transfer-plate to receive a blank therefrom, a punch and die coöperating with this last-named feed-plate and a uniting punch and die which likewise coöperate with the last-named feed-plate to unite the two blanks fed to said uniting punch and die by the feed-plates.

11. In a metal-working machine, the combination of a rotary transfer-plate, means for automatically and intermittently rotating said plate, a rotary feed-plate cooperating with said transfer-plate to deliver blanks thereto, means for automatically and intermittently rotating said transfer-plate, an automatically-operated punch and a die coöperating with said plate, a second rotary feed-plate coöperating with the transfer-plate to receive a blank therefrom, means for automatically and intermittently rotating said second-named feed-plate and an automatically-operated uniting-punch coöperating with this last-named feed-plate.

12. In a metal-working machine, the combination of a rotary transfer-plate, means for automatically and intermittently rotating said transfer-plate, a rotary feed-plate coöperating with said transfer-plate to deliver blanks thereto, means for automatically and intermittently rotating said transfer-plate, an automatically-operated punch and a die coöperating with said feed-plate, a second rotary feed-plate coöperating with the transfer-plate to receive a blank therefrom, means for automatically and intermittently rotating said second-named feed-plate, an automatically-operated punch and die coöperating with this last-named feed-plate and an automatically-operated uniting punch and die which likewise coöperate with the last-named feed-plate to unite the two blanks fed to said uniting punch and die by the feed-plates.

13. In a metal-working machine, the combination of a rotary blank-carrying transfer-plate, an overlapping blank-carrying feed-plate coöperating therewith and means for transferring a blank from one of said plates to the other without affecting the shape of the blank.

14. In a metal-working machine, the combination of an automatically-operated rotary blank-carrying transfer-plate, an automatically-operated overlapping blank-carrying rotary feed-plate coöperating therewith, a blanking punch and die coöperating with said feed-plate and means for automatically operating said punch and die, and means for transferring a blank from one of said plates to the other without affecting the shape of the blank.

15. In a metal-working machine, the combination of an automatically-operated rotary blank-carrying transfer-plate, two automatically-operated blank-carrying rotary feed-plates which overlap and coöperate with said transfer-plate, one to deliver a blank to and the other to receive a blank from said transfer-plate and an assembling-punch coöperating with one of the feed-plates.

16. In a metal-working machine, the combination of a rotary transfer-plate having a series of independently-movable blank-carrying devices and two blank-carrying feed-plates which coöperate with and overlap said transfer-plate, each of said feed-plates having a series of blank-receiving apertures, the apertures in one plate being adapted to deliver blanks to said transfer-plate while the apertures in the other plate are adapted to receive blanks therefrom.

17. In a metal-working machine, the combination of a rotary transfer-plate having a series of independently-movable blank-carrying devices, means for automatically and intermittently rotating said transfer-plate, two blank-carrying rotary feed-plates which coöperate with and overlap said transfer-plate, each of said feed-plates having a series of blank-receiving apertures, the apertures in one plate being adapted to deliver blanks to said transfer-plate while the apertures in the other feed-plate are adapted to receive blanks therefrom and means for automatically and intermittently rotating said feed-plate.

18. In a metal-working machine, the combination of a rotary transfer-plate having a series of blank-carrying devices, means for automatically and intermittently rotating said transfer-plate, two blank-carrying rotary feed-plates which coöperate with and overlap said transfer-plate, each of said feed-plates having a series of blank-receiving apertures, the apertures in one plate being adapted to deliver blanks to said transfer-plate while the apertures in the other plate are adapted to receive blanks therefrom, a blanking punch and die coöperating with each of said feed-plates, means for automatically operating each of said punches and means for automatically and intermittently rotating said feed-plates.

19. In a metal-working machine, the combination of a rotary transfer-plate having a series of blank-carrying devices, means for automatically and intermittently rotating said transfer-plate, two blank-carrying rotary feed-plates which coöperate with and overlap said transfer-plate, each of said feed-plates having a series of blank-receiving apertures, the apertures in one feed-plate being adapted to deliver blanks to said transfer-plate while the apertures in the other feed-plate are adapted to receive blanks therefrom, means for automatically and intermittently rotating said feed-plates, a blanking punch and die coöperating with each of said feed-plates, means for automatically operating each of said punches and a closing or uniting punch and die coöperating with said transfer-plate and with one of said feed-plates.

20. In a metal-working machine, the combination of a plurality of freely-movable rotary blank-carrying feed-plates, means for delivering blanks successively to said plates, automatic means for simultaneously and intermittently rotating said plates and means for automatically locking said plates against movement when the plates are out of action and for automatically releasing the locking means before the means for rotating said plates are brought into action.

21. In a metal-working machine, the combination of a transfer-plate having spring-pressed blank-receiving arms, means for moving said transfer-plate, a blank-carrying feed-plate coöperating with said said transfer-plate to receive blanks therefrom, means for forming the blanks in said feed-plate and means for delivering the blanks from said transfer-plate to a blank-containing portion of the feed-plate.

22. In a metal-working machine, the combination of a transfer-plate having spring-pressed blank-receiving arms, means for moving said transfer-plate, a blank-carrying feed-plate coöperating with said transfer-plate and a punch coöperating with the feed-plate and adapted to unite the blanks carried thereby with those delivered from the transfer-plate.

23. In a metal-working machine, the combination of a rotary transfer-plate having spring-pressed blank-receiving arms, means for automatically and intermittently rotating said transfer-plate, a rotary blank-carrying feed-plate coöperating with said transfer-plate to receive blanks therefrom, means for automatically and intermittently rotating said transfer-plate and a uniting-punch coöperating with the feed-plate and adapted to unite the blanks carried thereby with those delivered from the transfer-plate.

24. In a metal-working machine, the combination of a transfer-plate having spring-pressed blank-receiving arms, means for moving said transfer-plate, a blank-carrying feed-plate coöperating with said transfer-plate, means for forming a blank in said feed-plate and means for delivering the formed blank from said feed-plate to said transfer-plate.

25. In a metal-working machine, the combination of a rotary transfer-plate having spring-pressed blank-receiving arms, means for automatically and intermittently rotating said transfer-plate, a rotary blank-carrying feed-plate coöperating with said transfer-plate, said feed-plate having a series of blank-receiving apertures therein, blanking and forming punches coöperating with the feed-plate, means for automatically and intermittently rotating said transfer-plate and automatically-operated means for delivering a blank from said feed-plate to said transfer-plate.

26. In a metal-working machine, the combination of a rotary transfer-plate having spring-pressed blank-receiving arms, means for automatically and intermittently rotating said transfer-plate, a rotary blank-carrying feed-plate coöperating with said transfer-plate and adapted to overlap the same, said feed-plate having a series of blank-receiving apertures therein, means for automatically and intermittently rotating said transfer-plate, blanking and forming punches and dies coöperating with said feed-plate, one of said punches being adapted to deliver a blank from said feed-plate to said transfer-plate.

27. In a metal-working machine, the combination of a rotary transfer-plate having spring-pressed blank-receiving arms, means for automatically separating said arms to receive and deliver the blanks carried thereby, means for automatically and intermittently rotating said transfer-plate, a rotary blank-carrying feed-plate coöperating with said transfer-plate and adapted to overlap the same, said feed-plate having a series of blank-receiving apertures therein which are adapted to be brought into register with receiving-arms of the transfer-plate, means for automatically and intermittently rotating said transfer-plate and automatically-operated means for delivering a blank from said feed-plate to said transfer-plate.

28. In a metal-working machine, the combination of a rotary transfer-plate having spring-pressed blank-receiving arms, means for automatically separating said arms to receive and deliver the blanks carried thereby, means for automatically and intermittently rotating said transfer-plate, a rotary blank-carrying feed-plate coöperating with said transfer-plate and adapted to overlap the same, means for automatically and intermittently rotating said transfer-plate, and an automatically-operated punch coöperating with said feed-plate and adapted to deliver a blank from said feed-plate to said transfer-plate.

29. In a metal-working machine, the combination of a transfer-plate having spring-pressed blank-receiving arms, means for moving said transfer-plate, a movable blank-carrying feed-plate coöperating with said transfer-plate to deliver blanks thereto, punches and dies coöperating with said feed-plate to blank and form the blanks therein, a second movable blank-carrying feed-plate coöperating with said transfer-plate to receive blanks therefrom, and means independent of the transfer-plate for feeding blanks to said second blank-carrying feed-plate.

30. In a metal-working machine, the combination of a transfer-plate having spring-pressed blank-receiving arms, means for moving said transfer-plate, a blank-carrying feed-plate coöperating with said transfer-plate to deliver blanks thereto, means for delivering blanks from said feed-plate to said transfer-plate, a second blank-carrying feed-plate coöperating with said transfer-plate to receive blanks therefrom, means for delivering a blank from said transfer-plate to said second-named feed-plate and means independent of the transfer-plate for conveying blanks to said second blank-carrying feed-plate.

31. In a metal-working machine, the combination of a transfer-plate having spring-pressed blank-receiving arms, means for moving said transfer-plate, a blank-carrying feed-plate coöperating with said transfer-plate to deliver blanks thereto, a punch coöperating with said feed-plate and adapted to deliver blanks from said feed-plate to said transfer-plate, a second blank-carrying feed-plate coöperating with said transfer-plate to receive blanks therefrom, a uniting-punch coöperating with said second-named feed-plate and adapted to deliver a blank from said transfer-plate to said second-named feed-plate, means for moving said feed-plates and means independent of the transfer-plate for conveying blanks to said second feed-plate.

32. In a metal-working machine, the combination of a freely-rotatable transfer-plate having spring-pressed blank-receiving arms, means for automatically rotating said transfer-plate, a freely-rotatable blank-carrying feed-plate coöperating with said transfer-plate to deliver blanks thereto, a second freely-rotatable blank-carrying feed-plate coöperating with said transfer-plate to receive blanks therefrom, means for automatically rotating said feed-plates simultaneously with the rotation of the transfer-plate and means for automatically locking the transfer and feed plates after each movement thereof and for automatically releasing said locking means before the moving means operate to move said plates.

33. In a metal-working machine, the combination of a transfer-plate having a plurality of spring-pressed blank-receiving arms, means for automatically moving said transfer-plate, means for automatically separating said arms and an automatically-operated blank-support coöperating with said transfer-plate to support the blank when it is released by the blank-receiving arms.

34. In a metal-working machine, the combination of a transfer-plate having a plurality of spring-pressed blank-receiving arms, means for automatically moving said transfer-plate, means for automatically separating said arms, an automatically-operated punch and die coöperating with said transfer-plate and an automatically-operated blank-support coöperating with said transfer-plate and with said punch and die to support the blank when it is freed from the blank-receiving arms.

35. In a metal-working machine, the combination of a transfer-plate having a plurality of spring-pressed blank-receiving arms, means for automatically separating said arms to receive and discharge the blank, means for automatically and intermittently moving said transfer-plate, an automatically-operated punch and die coöperating with said transfer-plate and an automatically-operated blank-support coöperating with said separating means and with said punch and die to support the blank when it is freed from the blank-receiving arms.

36. In a metal-working machine, the combination of a rotary transfer-plate having a plurality of spring-pressed blank-receiving arms, means for automatically separating said arms to receive and discharge the blanks, means for automatically and intermittently rotating said transfer-plate, an automatically and intermittently operated uniting punch and die coöperating with said transfer-plate and an automatically and intermittently operated blank-support coöperating with said transfer-plate and separating means and with the punch and die.

37. In a metal-working machine, the combination of a blank-carrying feed-plate, means for moving said feed-plate, a blanking punch and die adapted to blank directly into the feed-plate, a coöperating blank-carrying transfer-plate, means for moving said transfer-plate, means for delivering a blank to said transfer-plate from the feed-plate and means coöperating with said transfer-plate and feed-plate to automatically throw the machine out of action when the transfer-plate and feed-plate are not properly positioned with respect to each other and with respect to the blank-delivery means when the same is operated.

38. In a metal-working machine, the combination of a blank-carrying feed-plate, means for moving said feed-plate, a blank-carrying transfer-plate adapted to receive blanks from said feed-plate, means for moving said transfer-plate, a second feed-plate coöperating with and adapted to receive blanks from said transfer-plate, means for moving said transfer-plate and means coöperating with each of said plates for automatically throwing the machine out of action when any one of the plates is not properly positioned with relation to the others to accomplish the delivery of a blank from one to another of said plates.

39. The combination of a feed-plate having blank-receiving apertures therein, a cross-head carrying a punch which is adapted to coöperate with said blank-receiving apertures, a dummy punch adapted to enter the apertures in said feed-plate and means coöperating with said dummy punch for stopping the machine when an undue obstruction in an aperture of the feed-plate is interposed in the path of the dummy punch.

40. The combination of a main shaft, a feed-plate having blank-receiving apertures therein, a cross-head operated by said main shaft and carrying a punch which is adapted to coöperate with said blank-receiving apertures, a dummy punch carried by said cross-head and adapted to enter the apertures in said feed-plate and to sink to a predetermined depth therein and a fixed bed coöperating with said dummy punch to prevent a movement of the main shaft when the dummy punch is prevented from sinking to the predetermined depth within an aperture of the feed-plate.

41. The combination of a transfer-plate having blank-receiving apertures therein, a plurality of coöperating feed-plates having blank-receiving apertures which are adapted to register with the apertures in the transfer-plates, a cross-head carrying a plurality of blanking-punches, each of which is adapted to coöperate with the blank-receiving apertures in its respective feed-plate to directly blank therein, a dummy punch adapted to enter the apertures in one of said feed-plates and to sink to a predetermined depth therein, plungers carried upon a carrier and adapted to enter apertures in the feed-plates when the apertures therein are in register with the apertures in the transfer-plate and means controlled by said dummy punch and plungers to stop or throw the machine out of action when an obstruction is interposed in the path of the dummy punch or plungers within the apertures of its respective feed-plate or an obstruction is interposed in the path of the plungers.

42. The combination of a rotary transfer-plate having blank-receiving apertures therein, rotary feed-plates coöperating with said transfer-plate and having blank-receiving apertures which are adapted to register with the apertures in the transfer-plate, means for automatically and intermittently rotating said plates, a cross-head carrying a plurality of blanking-punches, each of which is adapted to coöperate with the blank-receiving apertures in its respective feed-plate, a dummy punch carried by said cross-head, said dummy punch being adapted to enter the apertures in one of said feed-plates and to stop the machine when more than one blank is contained in an aperture, a carrier, plungers carried upon said carrier and adapted to enter apertures in the feed-plates when the blank-receiving apertures therein are in register with the blank-receiving apertures in the feed-plate, a two-part clutch and an abutment connected to said plungers for operating the clutch to throw the machine out of action when an obstruction is interposed in the path of the plungers.

43. The combination of a punch and die, means for moving said punch and die toward each other, a spring for restoring said die to its normal position and an automatically-operated latch adapted to contact with said die and to force it to the normal position should the spring thereof become ineffective to operate it.

44. The combination of means for cutting tack-blanks, means for bending said blanks into the required form, means for cutting and forming head-blanks which are adapted to coöperate with said tack-blanks and mechanism for uniting said head and tack blanks to form a complete tack.

45. The combination of means for cutting tack-blanks, means for automatically and continuously bending said tack-blanks after they are cut, coöperating automatically-operated means for cutting and forming head-blanks which are adapted to coöperate with said tack-blanks, means for automatically assembling said tack and head blanks and mechanism for uniting said tack and head blanks to form a complete tack.

46. The combination of means for cutting cruciform tack-blanks, means for bending said cruciform blanks into U form, means for cutting and forming head-blanks which are adapted to coöperate with said tack-blanks and means for uniting said head and tack blanks to form a complete double-pointed tack.

47. The combination of means for cutting cruciform tack-blanks, means for automatically bending said cruciform blanks into U form, coöperating automatically - operated means for cutting and forming head-blanks which are adapted to coöperate with said tack-blanks, means for automatically assembling said blanks and means for uniting said head and tack blanks to form a complete double-pointed tack.

JOHN DRAHER.
FREDRICK MARGGRAFF.

Witnesses as to John Draher:
  M. JOHN RYAN,
  HENRY W. MINOR.
Witnesses as to Fredrick Marggraff:
  EMMA JUDGE,
  HENRY W. MINOR.